United States Patent [19]

Goldfein

[11] Patent Number: 4,907,842
[45] Date of Patent: Mar. 13, 1990

[54] VEHICLE AIR BRAKE SYSTEM AND VALVES FOR IT

[75] Inventor: Nathan L. Goldfein, Houston, Tex.

[73] Assignee: International Transquip Industries, Webster, Tex.

[21] Appl. No.: 263,624

[22] Filed: Oct. 27, 1988

[51] Int. Cl.$^4$ ............................................. B60T 17/16
[52] U.S. Cl. ......................................... 303/13; 303/89
[58] Field of Search ..................... 303/7, 9, 13, 15, 75, 303/76, 77, 89

[56] References Cited

U.S. PATENT DOCUMENTS

| Re. 29,913 | 2/1979 | Case et al. | 303/89 |
|---|---|---|---|
| 1,213,363 | 1/1917 | Henry | 303/89 |
| 1,486,939 | 3/1924 | Winter | 303/13 |
| 2,240,166 | 4/1941 | Stanley | 303/84 A |
| 3,151,525 | 10/1964 | Dobrikin et al. | 303/89 |
| 3,497,267 | 2/1970 | Dabrikin | 303/3 |
| 3,507,542 | 4/1970 | Cannella | 303/15 |
| 3,721,474 | 3/1973 | Rogers | 303/13 |
| 4,182,535 | 1/1980 | Fannin | 303/9 |
| 4,685,744 | 8/1987 | Luce | 303/13 X |

OTHER PUBLICATIONS

Kent'S Mechanical Engineers' Handbook, Design and Production Vol., 20th ed., (New York: John Wiley & Sons, Inc. 1950) pp. 13-13 to 13-14.
Bendix Catalog sheet describing Type R-12 Relay Valve.
Bendix Catalog sheet describing Type RE-6 Relay Emergency Valve.
Bendix Catalog sheet describing Type DD3.

Primary Examiner—Duane A. Reger
Attorney, Agent, or Firm—Vaden, Eickenroht, Thompson & Boulware

[57] ABSTRACT

An air brake system with a multifunction control valve; a multifunction control valve for an air brake system; various sub-valves within the multifunction control valve—including a pressure protection valve, a pressure reducing valve, an emergency control valve, and a syncro valve. In one embodiment all four types of sub-valves are within a single unitary housing of the multifunction valve.

43 Claims, 16 Drawing Sheets

VEHICLE AIR BRAKE SYSTEM AND VALVES FOR IT

BACKGROUND OF THE INVENTION

1. Field of the Invention

This application relates generally to a vehicle air brake system, to a multi-function valve and other valves and, in one embodiment, to improvements in a system of the type disclosed and claimed in U.S. Pat. No. 4,685,744 which is commonly assigned with this application.

2. Description of the Prior Art

Parking, emergency and service air brake systems that are presently employed on trucks, trailers, truck tractors, buses and other air-brake equipped vehicles generally include diaphragm brake chambers for all axles, including both non-steerable and steerable axles. The pressure supply systems which are employed in such air brake systems generally comprise compressors and reservoirs along with multiple valves employed for the various operating modes of the brake system. There are generally two separate air systems employed, namely, a service or primary system, and an emergency or secondary system. Not only are the valves numerous, but they vary in complexity of construction. Such valves include service relay valves, spring brake control valves, quick release valves and others. Operationally, treadle valves are commonly used for service brake applications and operated, push-pull valves are used for parking and emergency applications. Further, the power or pressure supply equipment utilize one-way and two-way check valves or other protection valves to protect one air system from another.

The purposes of having two air systems and the rather complex valving arrangements that operate therewith are many. One purpose is to provide safety in the event that there is a complete loss of pressure in one of the systems or at a connection between the tractor and the truck trailer of a motor truck vehicle. A further purpose of such systems is to allow a driver to release and reapply brakes in the event of pressure loss in one side of the system. It is, therefore apparent that safety and back-up operation are important in air brake systems. In fact, federal and state highway safety laws require that air systems meet certain requirements, including not only having a primary/secondary pressure operation, but also with regard to providing braking for emergency and parking operation prior to loss of air pressure.

The system of U.S. Pat. No. 4,685,744 was an improvement upon prior systems of this type in several respects. It includes a brake assembly at each brake actuator rod which contains a single diaphragm chamber. The diaphragm drives the brake actuator rod forward to apply the brakes when a sufficient pressure is supplied to the air receiving inlet side of the chamber. Otherwise a return spring returns the actuator to release the brakes. The input port to the chamber is connected to a two-way, open-center shuttle valve, one input to the valve being connected to the service or primary air supply and the other input to the valve being connected to the emergency or secondary air supply. In the service application, the service supply pressure is increased thereby closing the emergency input side. If there is failure or loss of pressure on either side, but not both, the valve will shut off the low pressure side and operate normally with respect to the remaining pressurized side. The brakes include a rack and emergency piston having a pawl end which engages and holds the actuator in place when there is loss of supply pressure and the brakes have been actuated. Prior to such actuation, an adequate supply of emergency air pressure maintains the pawl end in its disengaged state. After the pawl end is engaged, then a resupply of pressure applied to the emergency side of the shuttle valve and to the piston will relieve the holding pressure between rack and pawl, while lifting the pawl from the rack. In the emergency brake application sequence, the mechanical locking piston is delayed in its fall until air bleeds off the tank or after tank pressure reaches a predetermined level.

In some prior systems, a pressure protection valve on the primary tank prevents air flow until the emergency tank is partially full.

In the U.S. Pat. No. 4,685,744 system, the service line is in communication with both the primary and emergency systems. Thus, in service operation, actuating air pressure is supplied by both tanks.

Another system on the market is the Bendix DD3. This is a double diaphragm, air actuated, mechanically held brake. The mechanical locking brake assembly includes a tapered actuator rod. The DD3 uses roller balls in place of a piston rod. These roller balls are held away from the actuator rod by air until the emergency brake is applied. When applied, the actuator rod is forced forward by a smaller diaphragm to begin applying the brakes while at the same time the air holding the roller ball is exhausted and a spring forces it down onto the actuator rod. The roller balls are designed to move in only one direction. This allows the actuator rod to move forward and apply the brake but prevents the rod from moving backward and releasing the brake.

In order to release the emergency brake, air is applied to the smaller diaphragm as well as the roller ball. Since the Bendix DD3 system releases the emergency brake at the same pressure as was used to apply the brake, an independent foot application is required to release the parking brake. The Bendix DD3 does not time the mechanical locking brake. It applies the brake and engages the roller balls simultaneously. This could lead to early contact between the actuator rod and the roller balls and cause mechanical wear.

There has long been a variety of unrecognized, unaddressed, and/or unsatisfied needs related to brake systems. These needs include a need for:

a system which will reduce brake wear and brake drag by using a peak pressure to release the brakes and a reduced, yet sufficient, air pressure to apply the brakes evenly and gradually;

a system which will reduce stopping distances and increase vehicle stability by providing regulated pressure as desired to achieve uniform pneumatic balance to all brakes;

a system in which, even if one of the air supply lines is completely broken, or one of the reservoirs is ruptured or leaking, the brakes could still be applied;

a system in which there will still be air against a brake diaphragm even if all air reservoirs in the system are emptied and in which the flow lines are protected with one way check valves and an automatically closing port which prevent the unwanted discharge of air on the brakes;

a system in which stepping on a footbrake in a service brake system will effectively result in the disengagement of brake locking mechanism pistons and will relieve all air off an interrelated parking brake system instantaneously;

a system which is easy and safe to work on;

a system in which the number of individual valves and lines is reduced and one multifunction sequence and control valve controls and coordinates tank fillings and brake application;

a system which eliminates the need for an independent foot pedal application for a clean release of the mechanical locking mechanism by utilizing a peak pressure.

SUMMARY OF THE INVENTION

In one embodiment the present invention teaches a multifunction system for controlling and coordinating a vehicle air brake system including a multifunction sequencing valve for sequencing and controlling pressurized air flow between an emergency brake system and a mechanical locking braking system; a primary or service compressed air reservoir; an emergency or secondary reservoir; a supply line for supplying compressed air to the multifunction sequencing valve; and lines and channels for air flow through the sequencing valve and to and from the reservoirs and vehicle brake assemblies.

In one embodiment a multifunction sequencing valve according to this invention has

- a pressure protection valve (in the trailer mode) for insuring that the emergency reservoir is filled first and allows brake release before a service (secondary) tank is filled, or vice versa;
- a pressure reduction valve for insuring that air at a desired pressure is applied to the brakes;
- an emergency control valve for insuring the system is charged to a certain safe level prior to brake release; in a low pressure mode it insures that the brakes can still be applied at the desired pressure; opens at a higher pressure than that at which it closes, so system air-up is not required each time the brakes are applied at a marginal pressure;
- a syncro valve which once brakes are applied, controls the locking pistons of the brakes so they release and are applied at the desired pressure without unnecessary wear or frictional contact with push rod racks;
- one-way check valve means for controlling and directing flow to the various other valves and reservoirs;
- a bypass valve for allowing air pressure to bleed by the syncro valve to lock the brakes;
- a bypass valve to allow a peak pressure to be achieved for brake release; and
- inlet ports for receiving compressed air from a compressed air supply and lines or channels through which this air can be controllingly communicated to a compressed air reservoir or reservoirs in an air brake system and to brake assemblies and other valves and apparatuses in the system.

The multifunction sequencing valve can be fashioned and used to signal any other valve in the system.

The above-described valve sequencing can be employed with a variety of brakes, including but not limited to single diaphragm and dual diaphragm brakes, locking piston brakes, and brakes which have a pressure separator valve controlling flow to a diaphragm or diaphragms (see, e.g., U.S. Pat. No. 4,685,744). Also this invention is directed to systems for vehicles which use air brakes, including, but not limited to, tractors, buses, trucks, and trailers.

The present invention recognizes and addresses the previously-mentioned unaddressed long-felt needs and provides a satisfactory meeting of those needs in its various embodiments. In various embodiments the present invention teaches a new emergency control valve; a new syncro valve; and a new pressure valve. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings and photographs. Although these descriptions are detailed to insure adequacy and aid understanding, this is not intended to prejudice that purpose of a patent which is to claim an invention no matter how others may later disguise it by variations in form or additions or further improvements. The claims at the end of this specification are intended as the chief aid toward this purpose.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification, It is to be noted, however, that the appended drawings illustrate only a preferred embodiment of the invention and are therefore not to be considered limiting of its scope, for the invention may admit to other equally effective embodiments.

DESCRIPTION OF PRESENTLY-PREFERRED EMBODIMENTS

Figure 9:
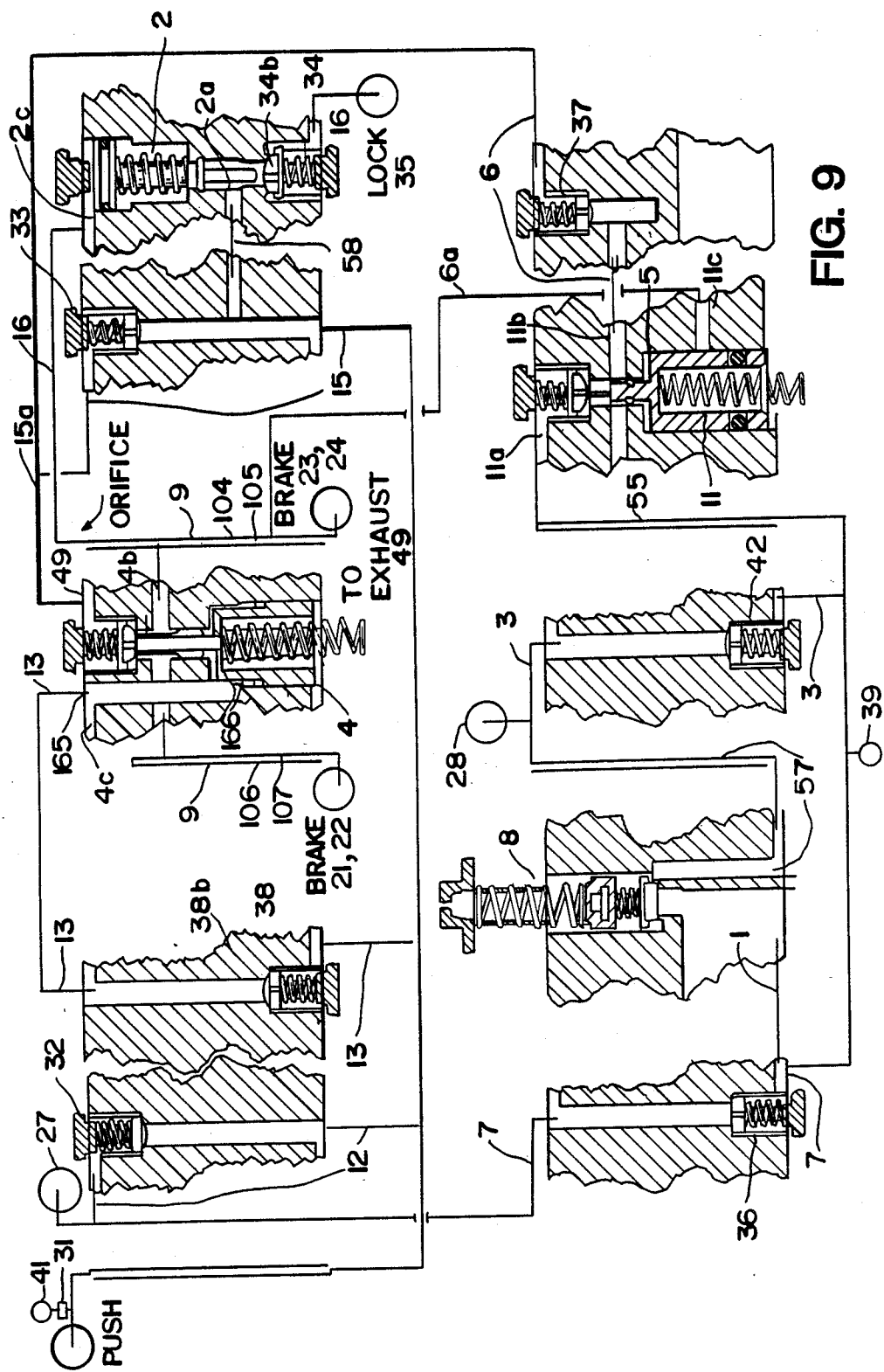
FIG. 9 is a schematic view of the channels and valves of the valve of FIG. 1.

Within the multifunction controlling and sequencing valve 10 are disposed a variety of interconnected valves as pictured in FIG. 9 including a syncro valve 2, an emergency control valve 4, pressure protection valve 8, a pressure reducing valve 11, a bypass valve 38, a bypass valve 34 which is part of the syncro valve 2, a two-way valve 31, and various one-way check valves 32, 33, 36, 37, and 42. The syncro valve 2 has a supply port 2a, a delivery port 34b, and a control port 2c. The emergency control valve 4 has a supply port 4a, a delivery port 4b, and a control port 4c and is in communication with an exhaust port 49. The pressure protection valve has a supply port 8a and a delivery port 8b. The pressure reducing valve 11 has a supply port 11a, a delivery port 11b, and sensor or control port 11c. A signal port 39 is provided in the body 56 of the valve in communication with channels 3 and 63 in the valve 10.

Figure 6:
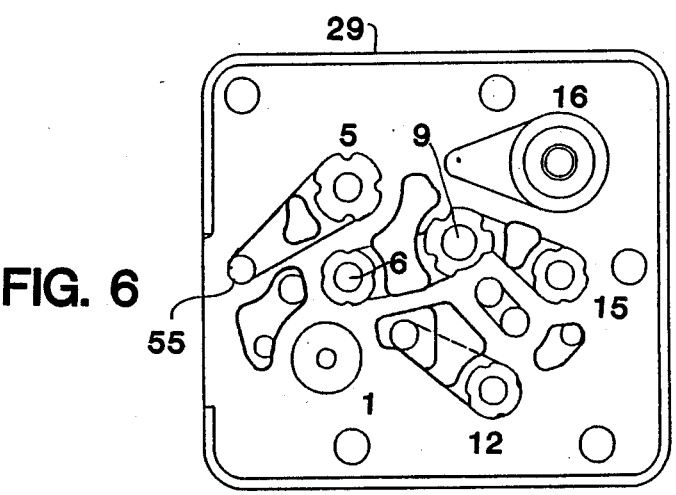
FIG. 6 is a schematic view of channels of the valve body of FIG. 1 as seen from the top of it.
Figure 7:
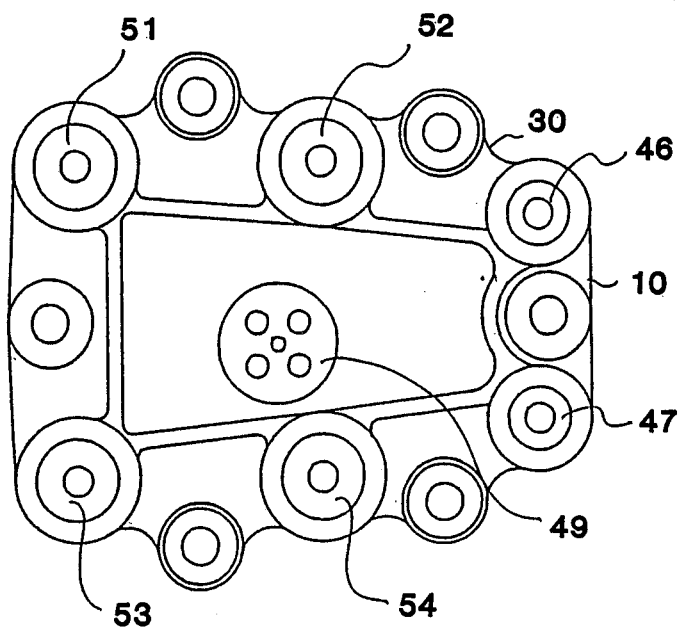
FIG. 7 is a view of the bottom of the valve of FIG. 1.
Figure 8:
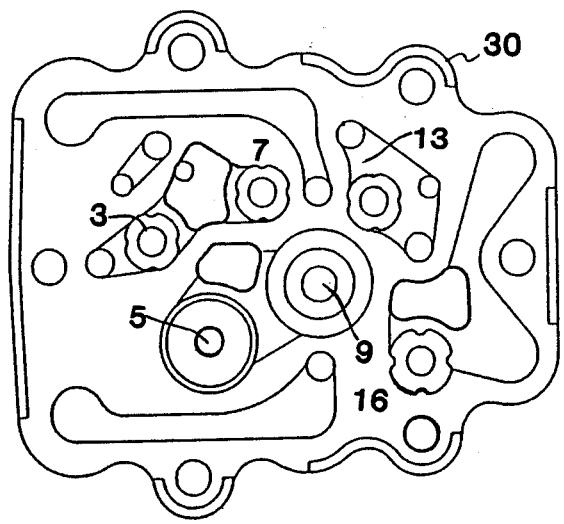
FIG. 8 is a schematic view of channels of the valve of FIG. 1 as seen from the bottom of it.
Figure 10:
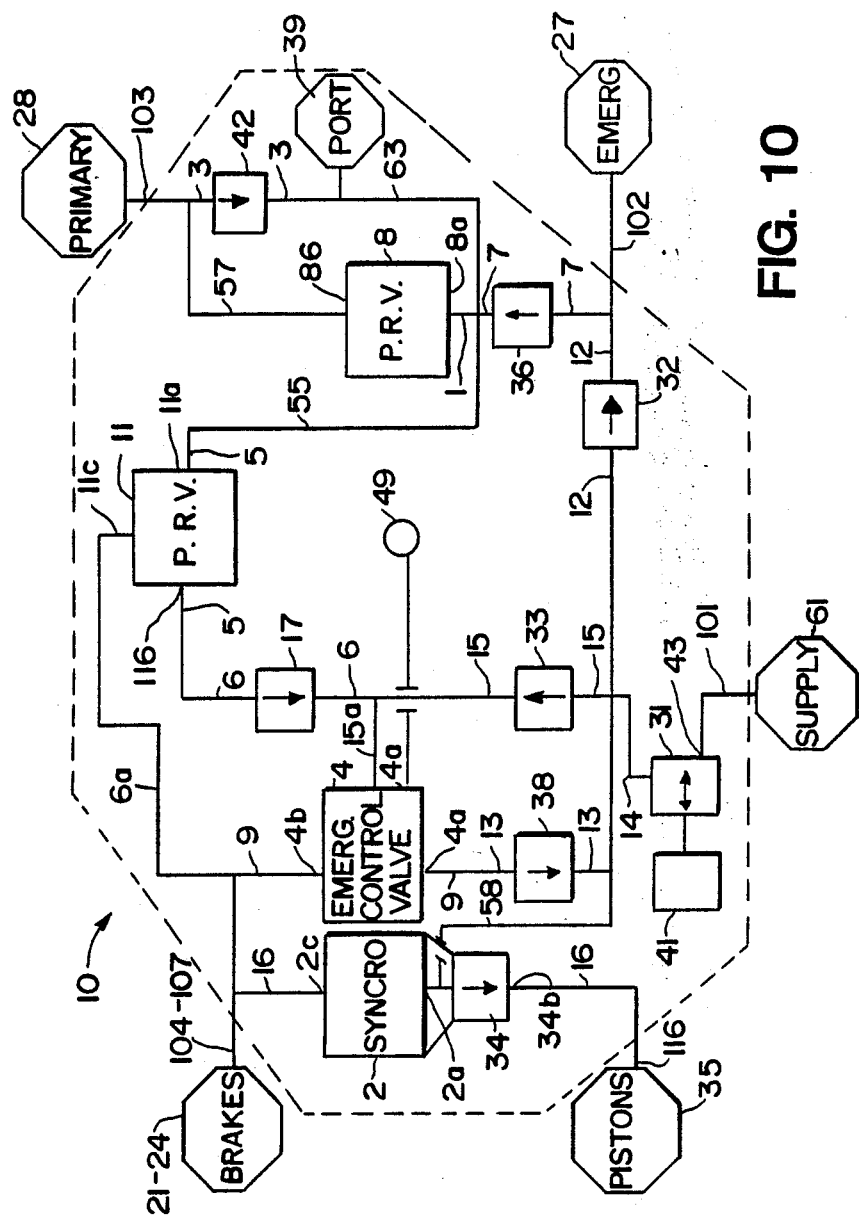
FIG. 10 is a schematic view of a system according to the present invention with the multi-function controlling and sequencing valve of FIG. 1.

FIGS. 6 and 8 as well as FIGS. 9 and 10 illustrate channels in which certain of the valves are disposed in the body of the MF valve 10. The body is comprised of a top plate 29, a body 56, and a bottom plate 30. The pressure protection valve 8 is disposed in a channel 1. The pressure reducing valve 11 is disposed in a channel 5. The emergency control valve 4 is disposed in a channel 9. The syncro valve 2 with its bypass valve 34 are disposed in a channel 16. A one-way check valve 42 is disposed in a channel 3. Referring now to FIG. 8, a one-way check valve 36 is disposed in a channel 7. A one-way check valve 32 is disposed in a channel 12. A bypass valve 38 is disposed in a channel 13. A one-way check valve 33 is disposed in a channel 15.

The valve 10 and its component valves as well as systems according to this invention are described here as used with a braking mechanism disclosed in U.S. Pat. No. 4,685,744 as previously described. It is of course within the scope of this invention that its disclosures can be used with other types of braking systems and the claimed embodiments are to limited to embodiments including apparatuses according to this prior art patent.

Figure 18:
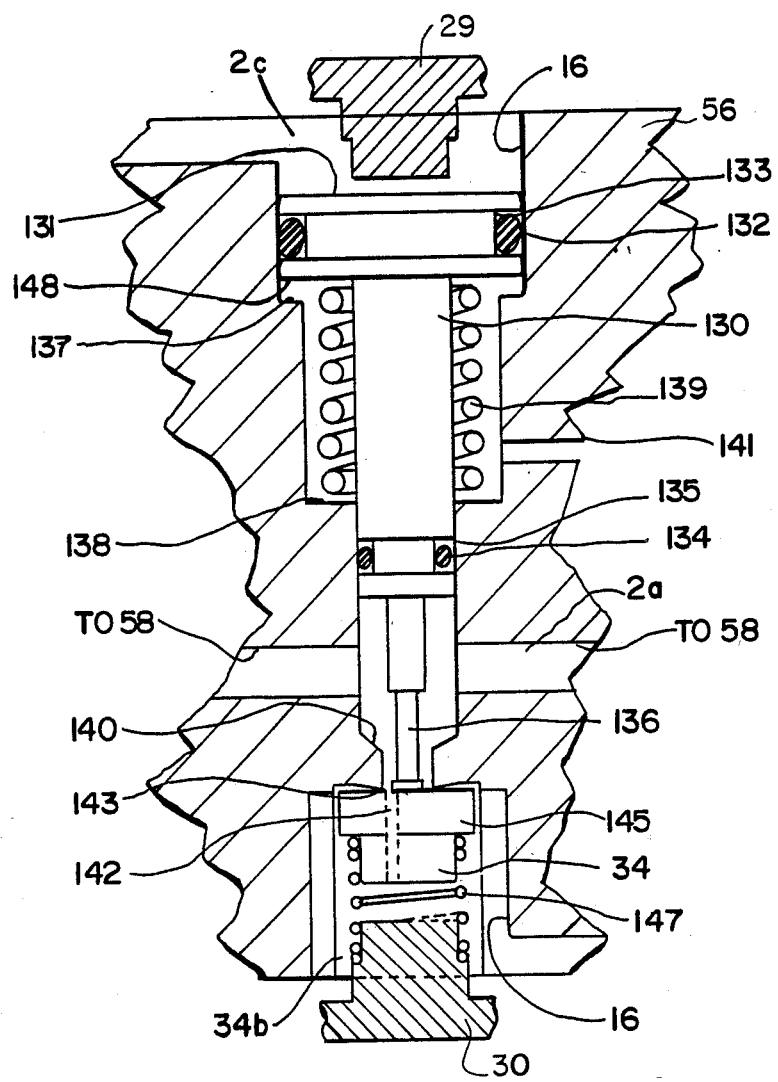
FIG. 18 is a side cross-sectional view of a syncro valve according to this invention.

As shown in FIG. 10, in the trailer mode the one way check valve 42 allows air to come from a primary reservoir 28 through line 103 and channel 3 without allowing air to flow through channel 3 to the reservoir 28. If an emergency reservoir 27 has no pressure, the check valve 36 allows air from reservoir 28 to maintain pressure. If the primary reservoir 28 has no pressure, the check valve 42 in combination with the pressure protection valve 8 allows the emergency reservoir 27 to maintain pressure. The one way check valve 36 allows air to flow from reservoir 27 without permitting air to flow back into reservoir 27. One way check valve 32 allows air to fill reservoir 27 and prevents air from flowing back to supply 61. Also air flowing through the valve 32 eventually flows into and fills the reservoir 28 through the pressure protection valve 8. One way check valve 37 allows air to flow from the pressure reducing valve 11 at the desired reduced pressure effected by the pressure reducing valve to the emergency control valve; but the valve 37 prevents air at a peak pressure from flowing to the pressure reducing valve 11. The one way check valve 33 allows air at a peak pressure from supply 61 to flow to emergency control valve 4; but the valve 33 prevents air at a reduced pressure from flowing to and through lines 15, 14 and 101, or port 41. The syncro valve 2 includes the bypass valve 34. The syncro valve 2 can be adjusted for any delay between brake actuation and engagement of locking pistons by adjusting a spring 139 (as shown in FIG. 18). If the syncro valve or its connected system malfunctioned, the bypass valve 34 would allow air from port 34b to leak out from the pistons 35 effecting piston engagement in a few seconds. The operation of the sycro valve 2, emergency control valve 4, pressure reducing valve 11, and pressure protection valve 8 is discussed in greater detail in connection with FIGS. 18 to 21. It is within the scope of this invention to provide a multifunction valve and a system with such a valve in which the connections to MF valve 10 are switched so that the service reservoir 28 is filled first, releasing the brakes, and then permitting filling of the emergency reservoir 27 so that service air will be available when the brakes are released.

Figure 11:
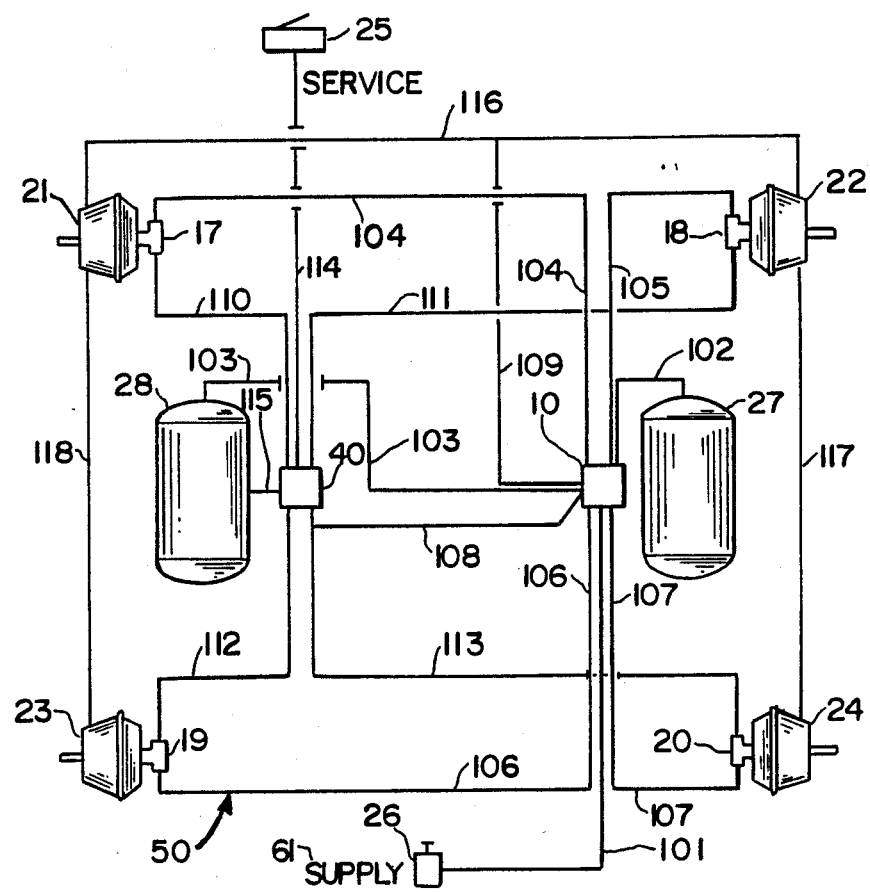
FIG. 11 is a schematic view of the system of FIG. 10 as adapted for truck tractors.

As shown in FIG. 11 in a system 50 for a trailer according to the present invention employing a multifunction controlling and sequencing (MF) valve 10 according to the present invention, the system 50 includes four brakes 21, 22, 23, 24, two on each of two axles (not shown) of the trailer. It is preferred that these brakes be as disclosed in U.S. Pat. No. 4,685,744 with a two-way shuttle check valve 17, 18, 19, 20 for each brake as described therein, but conventional spring brakes and conventional valves may be used. The present invention is not limited to a number of brakes or a number of axles.

Figure 14:
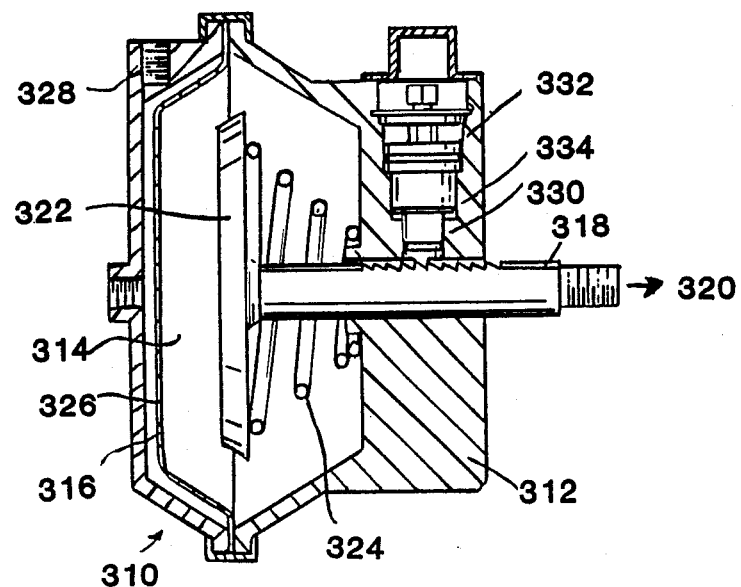
FIG. 14 is a cross-sectional view of a prior art brake assembly.
Figure 15:
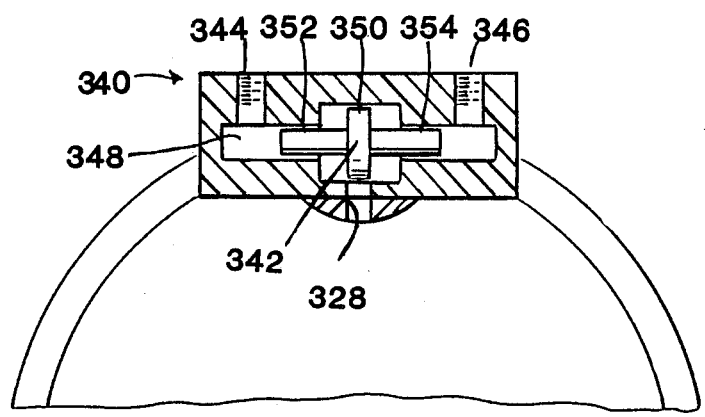
FIG. 15 is a cross-sectional view of a prior art two-way shuttle check valve connected to a brake assembly such as the one of FIG. 14.

The brake as shown in FIG. 14 and the two-way shuttle valve as shown in FIG. 15 are disclosed in U.S. Pat. No. 4,685,744 and the description of them that follows is substantially from that patent. Numerals have been changed for consistency with this application. A brake assembly 310 has a housing 312 defining a chamber 314 in conjunction with a cover 316. An opening in housing 312 accommodates the axial movement of brake push or actuator rods 318. A movement in direction 320 to the right as shown in the drawing applies the brake which operates in conjunction with the actuator rod.

The position of rod 318 which is contained within chamber 314 includes actuator rod plate 322. A return spring 324 located between plates 322 and housing 312 internally within chamber 314 biases actuator rod in the return or opposite direction from direction 320.

A single diaphragm 326 is held by the joining of cover 316 to housing 312 and divides chamber 314 into two sections, namely, the actuator section on the right in the drawing in which the actuator rod is located and the air section on the left in the drawing to which air is applied under pressure. An inlet opening for pressurized air is established through cover 316 at inlet port 328 at the upper left portion of the drawing.

When no service or emergency air is being applied at inlet port 328, diaphragm 326 is in a depressurized condition allowing actuator rod 318 to be at its full left or deactuated position.

Upon application of service or emergency brake air pressure at inlet port 328, air fills the left portion of chamber 314 to move the center portion of diaphragm 326 to the right. Such diaphragm movement causes the diaphragm to contact actuator rod 318, which causes the actuator rod to move to the right or direction 320, thereby applying the brake of the vehicle connected to the rod. At the same time, return spring 324 is compressed. Spring 324 is not a powerful spring but is only sufficiently strong to return the actuator rod to the left upon release of actuating air pressure from the left side of chamber 314.

FIG. 14 shows the condition of the brake assembly in the parking application condition. Prior to describing this condition, further parts of the drawing need to be identified. The upper portion of actuator rod 318 machined to form a rack having the vertical sides on the right side of each tooth depression in the ramp side of each tooth on the left, as shown in the drawing. Hence, when the pawl end of a locking piston is inserted at right angles to the rack, the pawl-and-rack action constrains actuator rod 318 from moving to the left but allows the actuator rod to move in direction 320 to the right with the application of additional actuating force on the actuator rod. Locking piston 330 operates within its piston housing and includes the conventional parts with O-rings and the like to permit easy operation in its piston housing. A bias spring 332 is also included for urging piston 330 in the downward direction. A port 334 in the piston chamber or housing below the large center portion of the piston is connected to an emergency air supply for acting in the opposing direction to the bias action of spring 332. That is, if the applied pressure to port 34 is above a predetermined level, the downward force of spring 332 is overcome and piston 330 will be held so that its pawl end is out of engagement with the rack previously described. If the applied pressure at port 34 is below that level, then the pawl end is pushed into engagement with the rack.

Now referring to FIG. 15, a cross-sectional view of a two-way shuttle valve 340 with an open-center shuttle valve mechanism 342 is illustrated. Air pressure from the valve 340 is applied to port 328 of the brake assembly illustrated in FIG. 14. Valve 340 has two inputs, namely, ports 344 and 346, input port 344 being connected to the service air supply system of the overall air brake system and input port 346 being connected to the emergency or secondary air supply system. Shuttle valve mechanism 342 operates within valve chamber 348 and is free to move either to the left or to the right of the center position shown depending on the pressure differential appearing at the inlet ports. Center portion 350 of the shuttle mechanism is circumferentially larger than its end portions 352 and 354 on either side thereof. However, the internal dimension of chamber 348 in which center portion 350 operates is larger than the dimension of 348 to permit passage of air from either direction passing thereby and out port 328, although applying some side pressure to center portion 350 as it does so. Port 328 opens into internally the large portion of chamber 348, preferably at center position. End portions 352 and 354 of the shuttle valve mechanism operate respectively within portions of chamber 348 which are just slightly larger than these end portions and hence air passage is permitted to pass by. When center portion 350 moves to its limit to the left in the drawing shown, however, the contact of the shuttle valve mechanism with the shoulders of the reduced portion of the chamber forms an effective seal with center portion 350 that prevents air flow from entering into the center portion of chamber 348 from inlet port 344. In similar fashion movement of center portion 350 of the shuttle mechanism seals off inlet port 346 when the valve mechanism is moved to its full righthand position. In operation it will be seen that when the air pressure applied at inlet port 344 and inlet port 346 are the same, the shuttle valve mechanism assumes its center position. Hence, the pressure in chamber 348 will be equal to the two inlet pressures. This will also be the pressure delivered to outlet port 328. However, if either inlet air pressure is greater than the other, the shuttle valve mechanism will move to seal off the low pressure side and only the high pressure will be presented to port 328.

Returning the system 50 disclosed in FIG. 11, the MF valve 10 is connected between various reservoirs, flow lines, and shuttle valves as will be described in detail below. A supply line 101 provides a channel for air under pressure to flow to the MF valve 10 and from it to the other devices in the system. A push-pull parking brake apparatus 26 is shown connected to the supply line 101. The supply line 101 is communicatively connected to the MF valve.

Air from supply 61 flows through line 101, through valve 31 and valve 32 (as shown in FIGS. 9 and 10), and then flows out the MF valve through a flow line 102 to an emergency (secondary) air reservoir 27. Flow lines 104, 105, 106, 107 are connected between the MF valve 10 and the two-way shuttle check valves 17, 18, 19, 20 respectively. Air flows at the desired pressure from the MF valve through flow line 103 to a service (primary, supply) reservoir 28. A flow line 108 is communicatively connected between the MF valve 10 and a flow line 113 (of course the connection could be to any of the common lines 110–112, 114) which extends between a relay (service) valve 40 and the two-way shuttle valve 20. A flow line 109 is connected between the MF valve 10 and a flow line 116 connected between the brakes 21,22.

A service flow line 114 is connected between a typical foot pedal apparatus 25 on a service line and the relay valve 40. Flow lines 110, 111, 112, 113 are connected between the relay valve 40 and the two-way shuttle valves 17, 18, 19, 20, respectively. A flow line 115 is connected between the relay valve 40 and the service reservoir 28.

The relay valve 40 can be of a Type R-12 relay valve manufactured by the Bendix Corporation Heavy Vehicle Systems Group, or equivalent. Typically, air applied to the service port of the valve from service line 114 forces a relay piston down against a biasing spring to open a supply port connected to reservoir 28 line 115 to permit flow through four delivery ports to lines 110–113. Varying the pressure on line 114 causes the opening of the supply and delivery ports to vary accordingly to regulate the amount of brake application.

The output from supply reservoir 28 shows for example, four prior art brake assemblies 21–24, that are each connected through two-way shuttle check valves 17–20 via lines 110–113. Two of these substantially identical brake assemblies are typically connected to a non-steerable axle, but the present invention is not limited to use on non-steerable axles.

The system 50 of FIG. 11 has an MF valve 10, the component valves of which are disclosed in FIGS. 9 and 10. The brake assemblies 21-24 are disclosed in greater detail in FIG. 14. The following discussion necessitates reference to each of these drawings. To release the brakes when there is no air in the system of the brakes 21-24, air is charged into the system through the supply flow line 101 and to a two-way check valve 31 to a one way check valve 32 and from there into the emergency air reservoir 27. At this same time air is flowing to an emergency control valve 4 through a one way check valve 33 and to the brakes 21, 22, 23, 24 through the emergency control valve 4 to and through lines 104-107 to the two-way shuttle valves 17-20 (like valve 340, FIG. 15) which control pistonactuator rod assemblies in the brakes 21-24 as disclosed and described in U.S. Pat. No. 4,658,755. Air is also flowing through the bypass valve 34 of the syncro valve 2 to line 109 and then to the locking pistons 330 of the brake assemblies 21 -24. Air also flows through a one way check valve 36 and a line 55 to a pressure reducing valve 11 then through a one-way check valve 37 to the emergency control valve 4. At the same time, air is flowing to and through a bypass valve 38 to the emergency control valve 4. There is air building up against diaphragms 326 in the brakes 21-24, which air is trying to push the brakes' actuator rods 318 out to release pistons 330 which are holding the rods (as shown in U.S. Pat. No. 4,658,744 which is incorporated herein entirely for all purposes).

Now the emergency reservoir 27 is filling with compressed air while the diaphragm chambers on the brakes 21-24 are also filling, increasing pressure beneath the pistons holding the brake actuator rods.

Once the emergency reservoir 27 has filled to a predetermined pressure (e.g. air at a pressure greater than 60 p.s.i.), the pistons holding the brake actuator rods lift up and disengage the rods. Then the air going to a control port 4c of the emergency control valve 4 reaches the desired pressure (e.g. 80 p.s.i.) and a delivery port 4b of the emergency control valve 4 opens to exhaust air from diaphragm chambers 314 of the brakes 21-24 which allows the actuator rods 318 to retract. These rods, which push brake pads against brake drums (or shoes against drums or discs), retract thereby releasing the brakes.

The brakes can be released without air pressure in the primary reservoir 28. Air from supply 61 at desired operating pressure is applied to the MF valve 10 through line 101. Emergency reservoir 27 must be working and have operating pressure also or the supply will be unable to sustain operating pressure through line 15a to the emergency control valve 4 because the line will try to supply the emergency reservoir 27 through check valve 32. Therefore if the emergency reservoir 27 has no air pressure or too little air pressure, air from supply 61 cannot reach operating pressure and the brakes cannot be released. If the primary reservoir 28 cannot maintain operating pressure however, then the pressure protection valve 8 and the check valve 42 combine to isolate the reservoir 28 from the rest of the valve 10. Therefore the brakes can be released without pressure in the primary reservoir 28.

After the brakes have been released, air, which previously was prevented from flowing from a pressure protection valve 8 to a service (primary, supply) reservoir 28, reaches a pre-set desired pressure which opens the pressure protection valve 8 and permits air flow to the service reservoir 28 to begin filling it. The brakes have been released and the trailer can move (or is being moved) as the two reservoirs fill with compressed air.

When the trailer is in motion and the operator of a tractor pulling the trailer desires to apply brakes, he or she pushes down on the foot pedal 25 which allows compressed air at a predetermined pressure to flow from an air source, such as an air tank on the tractor (not shown) into a service valve such as the conventional relay valve 40. Opening of the valve 40 permits air to flow at a regulated rate from the service reservoir 28 through flow lines 110-113, to the two-way shuttle valves 17-20 and thence into the brakes' diaphragm chambers thereby applying the brakes.

To park a trailer with the system 50 a parking brake apparatus is activated, e.g., pulling a button on an apparatus 26 as shown in FIG. 11, which opens flow line 101 permitting air in the line to exhaust out of it. This also exhausts the air off of the emergency control valve 4 via its port 4c which moves a piston upwardly in the emergency control valve thereby opening up the flow of air from the port 4a to the port 4b and thence to the diaphragm chambers of the brakes via lines 104-107 which sets the brakes for parking. Air is trapped in both reservoirs 27 and 28 by the one-way check valve 32, but air still flows through a one way check valve 42 or 36 to a supply port 11a of a pressure reducing valve 11 and thence, at a desired reduced pressure out of a discharge port 11b, to and through the one-way check valve 37 into the supply port 4a of the emergency control valve 4 for transmission to the brakes. When air in the diaphragm chambers of the brakes builds up to the desired predetermined level the syncro valve senses this through flow lines 16, 104-107 and, in response to this pressure, a piston moves down in the syncro valve 2 opening up bypass valve 34 so that air is released from the locking pistons out lines 58, 14, 101 and valve 31 or port 41 permitting the pistons to move down to engage and lock into the brakes' actuator rods, thereby setting the brakes. If for any reason the syncro valve 2 does not operate in this manner or if there is not enough air pressure to operate it, air from the brakes' piston chambers will leak out of a discharge port 34b of the bypass valve 34 and eventually the locking pistons will move down to engage the actuator rods.

To release the parking brakes after the system 50 is fully charged with compressed air, the button of apparatus 26 is pushed in. This introduces air under pressure into the system again through flow line 101. The air used in setting the brakes for parking flowed through the pressure reducing valve 11 and hence is at a lower pressure than the air now introduced into line 101. Suddenly there is air at a higher pressure at the one-way check valve 33 and air pressure at the supply line 101 is, therefore, being supplied to and through the emergency control valve 4 onto the brakes' diaphragms. At the same time there is a slow restricted flow of air into the emergency control valve via the bypass valve 38 so that when the button is activated on the apparatus 26 this causes a momentary peak pressure which effects release of the brakes quickly and efficiently. In such a brake application, the brakes are applied with reduced pressure (reduced with respect to the level of the pressure of air from the supply 61 and reservoirs 27, 28). Therefore applying peak pressure momentarily to the brakes before piston disengagement reduces the deleterious effects of friction or of back pressure caused by the operating mechanisms.

Figure 5:
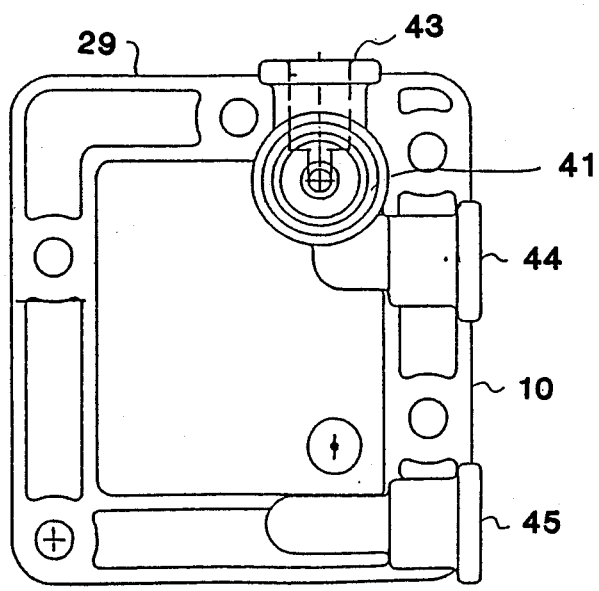
FIG. 5 is view of the top of the valve of FIG. 1.
Figure 12:
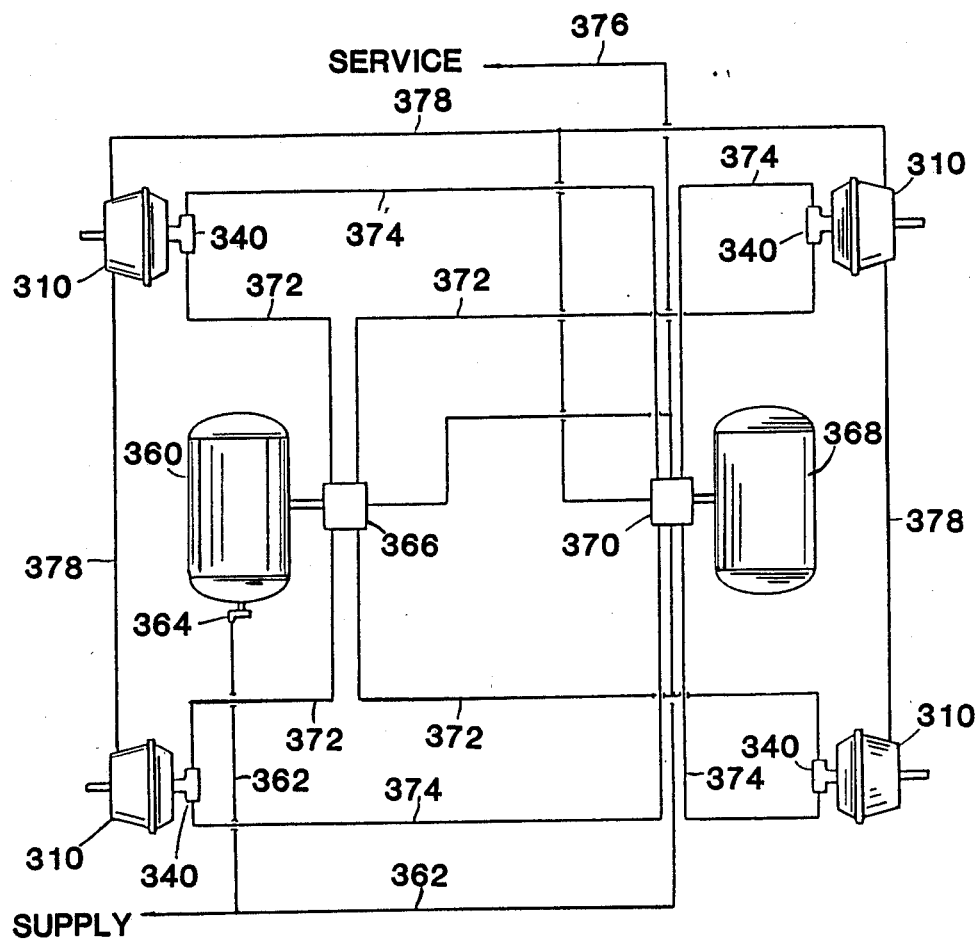
FIG. 12 is a reproduction of FIG. 5 of U.S. Pat. No. 4,685,744 showing a prior art system.

FIG. 12 is a reproduction of FIG. 5 of U.S. Pat. No. 4,658,744 showing an air brake system without a multifunction controlling and sequencing valve such as the MF valve 10 of the present invention. For the sake of clarity and consistency the numerals as used for FIG. 12 herein differ from those appearing in U.S. Pat. No. 4,658,744 by the addition of a "3" to each number; e.g. item 10 in U.S. Pat. No. 4,658,744 is item 310 in FIG. 12 herein. A system such as that of FIG. 12 has the following disadvantages and drawbacks when compared to a system according to the present invention:

No peak pressure can be achieved the brakes.

No means is provided for using reduced air pressure to set the brakes when parking as is achieved by the pressure reducing valve of the present invention. It is good to use reduced pressure for parking: to reduce wear on brake parts; to provide greater stability because of less locking-up of brakes; and to provide a tailored pressure for a particular vehicle and particular condition.

No means is provided for using air from either or both reservoirs to apply the brakes when parking. If either reservoir or lines to it are damaged, air pressure is lost and the brakes cannot be applied. In systems according to the present invention, if either line 103 or 102 is cut or damaged or any other single line is cut or damaged there will still be full air pressure applied to the brakes since the MF valve 10 is connected to both reservoirs 27,28.

In setting brakes as disclosed in U.S. Pat. No. 4,658,744 no means is provided to insure that the locking pistons will drop every time, since the pistons run directly off the air from reservoir 368 (FIG. 5 U.S. Pat. No. 4,658,744). To move the pistons the air must always be drained from the reservoir.

A balance port 41 on the MF valve 10 according to the present invention as shown in FIG. 10 makes it possible to have parking brakes automatically re-applied at the same pressure in the event a service application is made, e.g. if the foot pedal of the apparatus 25 is depressed resulting in the raising of the locking pistons and release of the parking brakes. Once the foot pedal is released (and raised) the parking brakes are automatically re-applied.

If the brakes are not set for parking, and the operator depresses the foot pedal of the apparatus 25, the parking brakes cannot be applied in the parking mode until the foot pedal is released (until the air off the balance port is diminished) because the MF valve will not permit the pressure on line 14 to be relieved which would initiate the parking sequence until air is exhausted from both service and supply sources. The two way check valve 31 will maintain air on line 14 until both line 101 and port 43 are evacuated or no longer have air in them, thus insuring that the vehicle is always parked at the same desired air pressure supplied by the pressure reducing valve. This insures that the vehicle or trailer can only be parked at a desired parking pressure and not at the higher pressure of the service line 114 (see FIG. 11), thus reducing problems related to releasing the brakes and making it impossible to put a high dangerous pressure on the brake drums.

Figure 13:
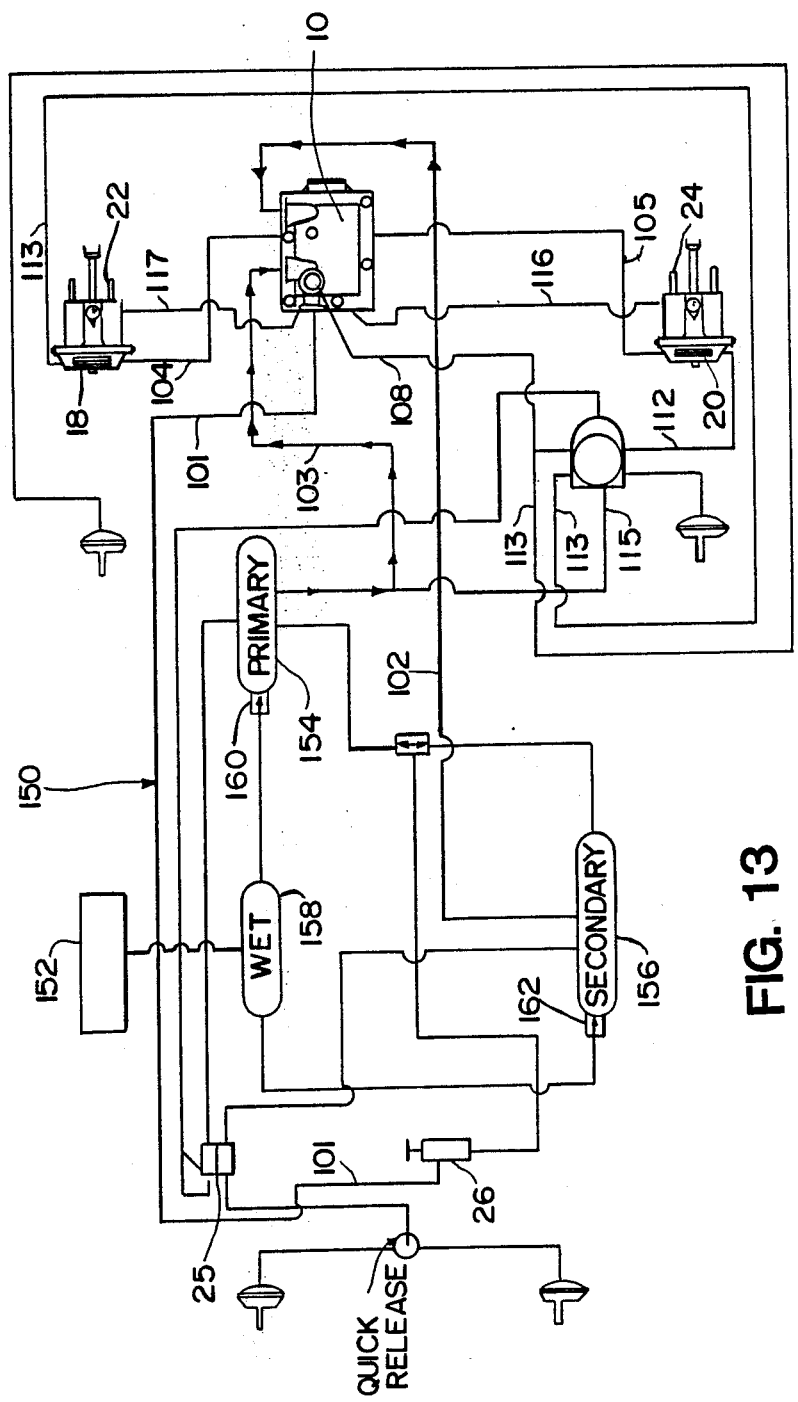
FIG. 13 is a schematic view of a system according to the present invention as adapted for truck trailers.

A system 150 according to the present invention for use with a truck tractor is illustrated in FIG. 13. In this system the MF valve 10 has no pressure protection valve 8 since compressed air is supplied to the two reservoirs from a compressor 152 (or compressors) of the truck tractor which deliver air at a desired pressure to both a primary reservoir 154 corresponding to reservoir 28 of the system 50 and to a secondary reservoir 156 corresponding to the reservoir 27 of the system 50 shown in FIG. 11. Also there is no need for the one-way check valve 32 of system 50 because air is supplied directly to the emergency (secondary) reservoir rather than through the MF valve 10. Once the reservoirs of the system 150 are filled, pulling out the button on a parking brake apparatus 26 allows air to flow from the reservoirs 154, 156 to a pressure reducing valve in the MF valve 10 where the air pressure is reduced to a desired level. Pushing the button will apply a peak pressure to the diaphragms, relieving residual pressure off the locking pistons and allowing them to freely raise up as in the previously described trailer system 50. Since the system 150 utilizes air from the truck compressor 152 and because of, one way check valves 160 and 162, air flows only in a direction toward the MF valve 10 from the reservoirs 154, 156 and not vice versa. The truck compressor 152 charges compressed air into a common reservoir 158 from which the air flows to the reservoirs 154 and 156. But for the differences noted above, the system 150 is like the system 50 and the two function in the same manner. Similar items in system 150 as depicted in FIG. 13 bear the same identifying numerals as the items in the system 50.

Figure 1:
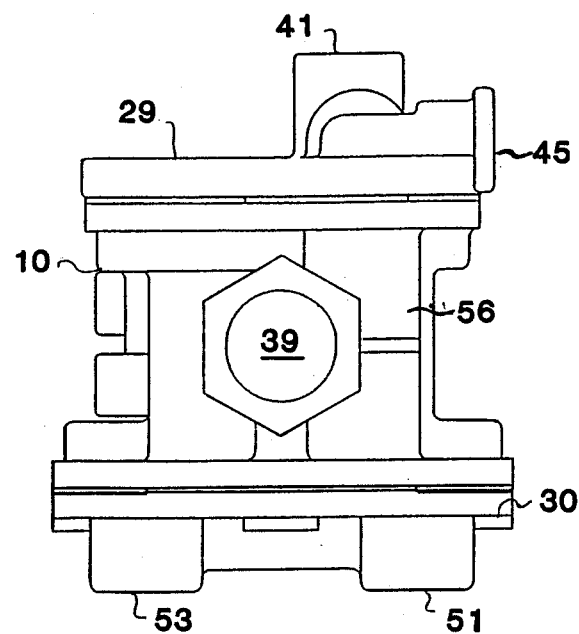
FIG. 1 is a front perspective view of a multifunction controlling and sequencing valve according to the present invention.
Figure 2:
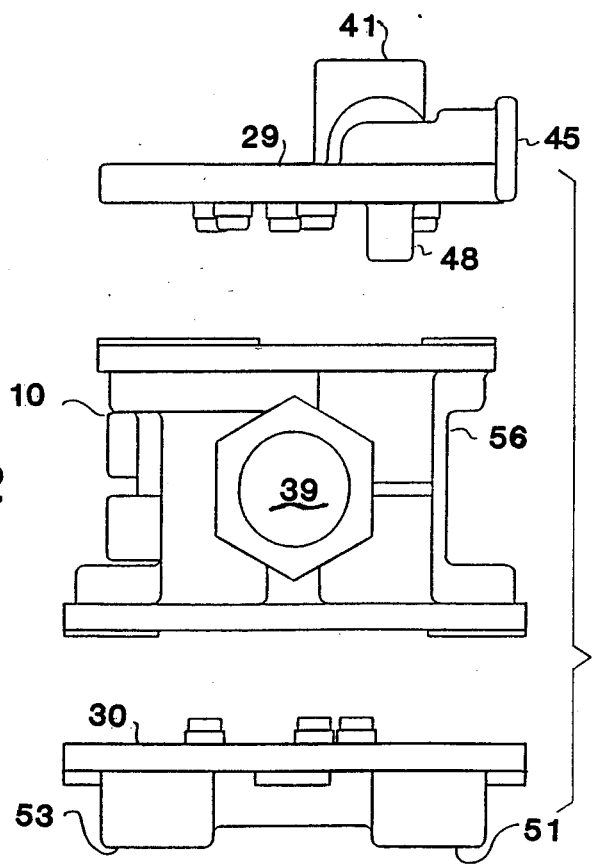
FIG. 2 is an exploded view of the valve of FIG. 1.
Figure 3:
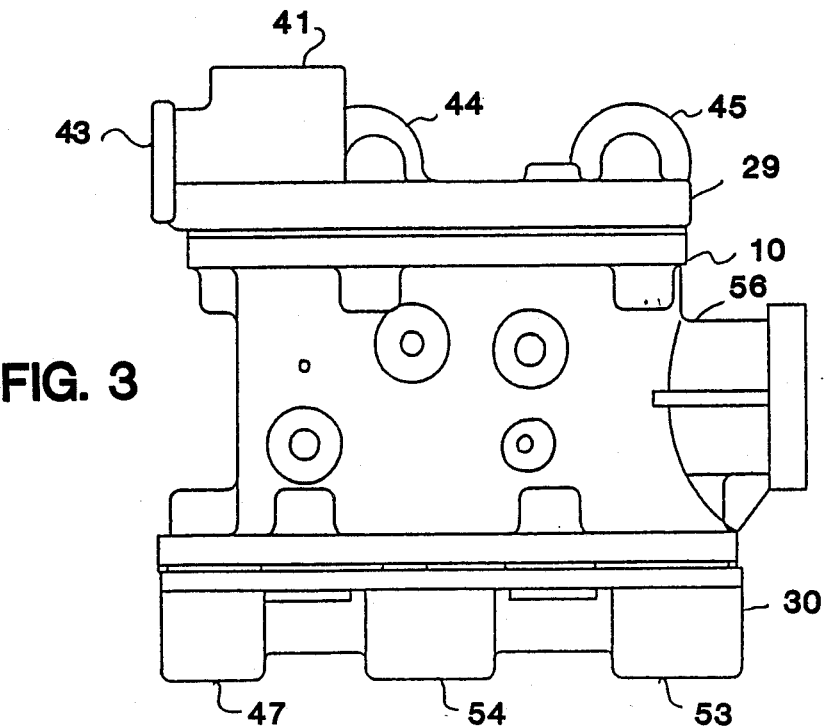
FIG. 3 is a view of the left side of the valve of FIG. 1.
Figure 4:
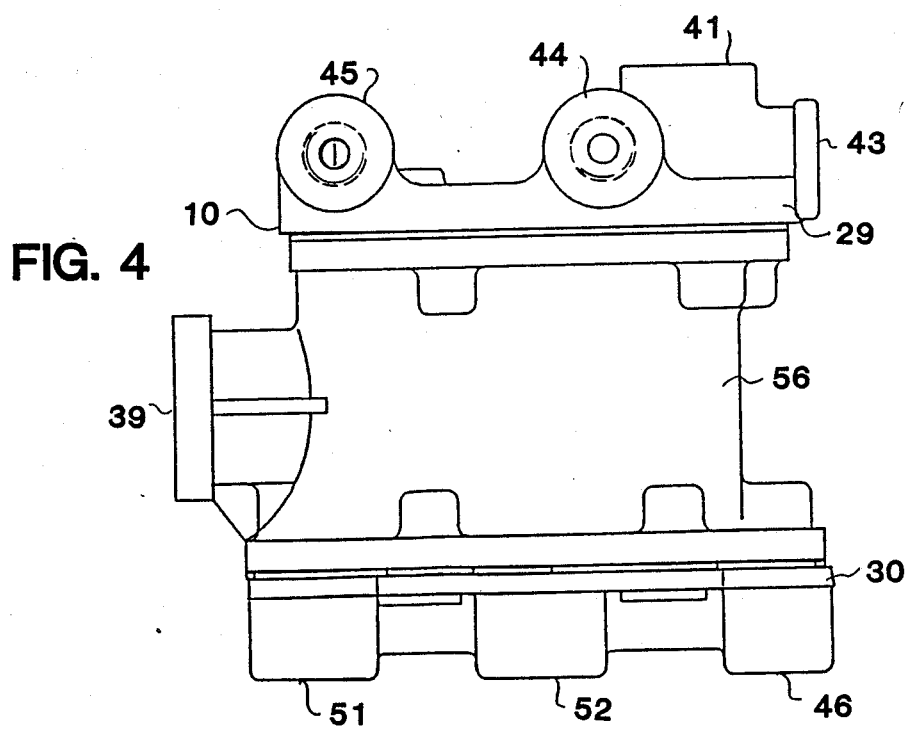
FIG. 4 is a view of the right side of the valve of FIG. 1.

A signal port 39 on the MF valve 10 shown in FIGS. 1 and 18 can be used as a connection to provide air through a line (not shown) to another valve. Also air can be supplied from either reservoir through the port 39 without using additional check valves or lines but simply by connecting up to the port. For example, air could be supplied via the port 39 to another relay valve used for another axle's parking application. Through lines 104-107 or 116 shown in FIG. 11 a signal can be provided by the valve 10 for signalling other valves such as spring brake control valves.

From the foregoing, it will be understood that the present system utilizes one line from the air supply to fill the reservoirs, while both the Bendix DD3 and U.S. Pat. No. 4,685,744 require two lines. The single line eliminates the need for an extra pressure protection valve.

The present system also provides the benefits of two pressure levels with only one supply. The systems of both Bendix DD3 and U.S. Pat. No. 4,685,744 release the emergency brake with the same diaphragm pressure that was used to set the brake. Friction generated by brake components requires an independent foot applicator to break the piston free. The present system delivers a peak pressure to overcome any friction without an independent brake application.

The systems of Bendix DD3 and U.S. Pat. No. 4,685,744 allow brake locking mechanisms to fall immediately after the supply line is exhausted, if desired. The present system on the other hand, allows the user to control the delay between brake actuation and piston engagement by the design, selection, and configuration of the spring 139 of the syncro valve 2. The Bendix DD3 anticipates engaging the lock as the brakes are fully actuated. This can cause excessive wear on the locking parts. The present system allows the user to coordinate the brakes so that the brakes are fully actuated before the pistons engage. Thus the actuator rods do not scrape the piston rods as the brakes are engaging.

The present system can use only one diaphragm to operate both service and emergency brakes (although it can also be used with multi-diaphragm brakes). The emergency brakes can be configured to hold as firmly as necessary. The application pressure can be very high and the peak pressure generated by the MF valve will still overcome any friction. The Bendix system, however, requires two diaphragms. It uses a smaller diaphragm to apply the emergency brakes. Thus, the emergency brakes are not as strong as the service brakes which use the second, larger diaphragm. The Bendix system also uses the same smaller diaphragm and the same pressure level to release the emergency brakes. Therefore, friction could require an independent brake application utilizing the larger diaphragm. The U.S. Pat. No. 4,685,744 uses only one diaphragm and only applies additional pressure during brake release to free the piston.

Systems according to the present invention insure that there is air in the emergency reservoir before the brakes are released. Air is needed in the emergency reservoir because, with air-applied mechanically-held brakes, there must be an air source to re-apply the brakes. These features satisfy federal regulations, including 49 CFR § 571.121 which governs air brake systems.

As shown in FIG. 18 the syncro valve 2 has a syncro piston 130 and a bypass valve 34 movably disposed in the channel 16. The syncro piston 130 has a piston face 131; a top O-ring recess 133 in which is disposed a top O-ring 132; a bottom O-ring recess 135 in which is disposed a bottom O-ring 134; a stinger 136; and a return spring 139 which encircles the piston 130. The channel 16 has a first shoulder 137, a second shoulder 138, a third shoulder 140 and a fourth shoulder 143. A breather tube 141 is communicatively connected to the channel 16 and vented to the atmosphere.

The bypass valve 34 has a valve member 145 movably disposed in the channel 16 and urged upwardly by a spring 147 which is connected to the valve member 145 and the bottom plate 30.

Air flowing from the diaphragm chambers of the brakes 21-24 enters the syncro valve 2 through its port 2c, pushing down on the face 131 of the piston 130. The stinger 136 moves and pushes down on the valve member 145 opening the bypass valve 34 which permits air holding up the brake locking pistons to flow to channels 58, 14, valve 31, supply 61 and port 41 (as shown in FIGS. 9 and 10) so that the locking pistons drop, engaging the brake actuator rods and setting the brakes. Coaction of a stop 148 on the piston 130 and the first shoulder 137 insure that the piston 130 can move only a desired distance. The spring 139 pushes against the stop 148 and the second shoulder 138. The spring 139 urges the piston 130 upwardly so that when there is insufficient air pressure pushing down on the face 131, the spring 139 holds the piston 130 up so that valve member 145 is against shoulder 143 thereby restricting flow to line 58 to delay the drop of the locking pistons until the desired pressure can be applied against the diaphragms of the brakes through channel 9 and lines 104-107 not shown in FIG. 9. This is the synchronization accomplished by the syncro valve. The piston 130 is sealed in the channel 16 by the two O-rings 132 and 134, while air trapped between them is vented to the atmosphere through the breather tube 141.

When the brakes are being released, utilizing the previously-described peak pressure, air from supply 61 flows through channel 58, syncro valve 2, out port 34b into channel 16 and then to the locking pistons to release them.

To park the vehicle, as air is being exhausted through channels 12-14, and 58, air is delivered to the brake diaphragms, through channel 9 and lines 104-107 (see FIG. 10), and, when a predetermined amount of air has been delivered, the piston 130 moves down, again in response to the air pressure on the piston face 131, opening the bypass valve 34 and thereby allowing the locking pistons to drop setting the brakes. Whether the piston 130 moves down or not, because of a bypass orifice 142 in the valve member 145, air in the channel 16 from the line 116 will flow out to channel 58 and out port 2a and the locking pistons will drop. Because of the bypass feature of the syncro valve 2 as provided by its bypass valve 34 and it orifice 142, flow does not stop through the valve 2 so that there is built in protection against an unwanted back pressure through the valve.

Figure 19:
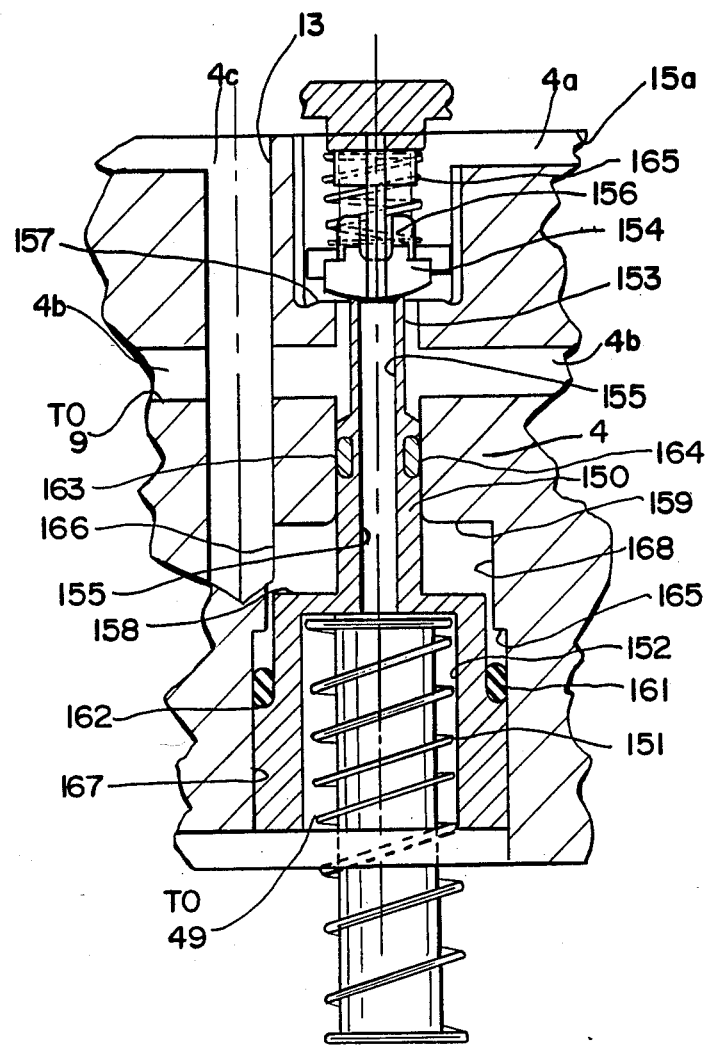
FIG. 19 is a side cross-sectional view of an emergency control valve according to this invention.

As shown in FIG. 19 the emergency control valve 4 has an emergency control valve piston 150 movably disposed in the channel 9, which piston is urged upwardly by a spring 151 biased against bottom plate 30 and disposed in a recess 152 in the piston 150. The piston 150 has a stinger 153 which is movable to contact and push upwardly a valve member 154 of the valve 4 which is movably disposed in the channel 9. A spring 156 urges the valve member 154 downwardly.

The valve member 154 is urged against a shoulder 157 by the spring 156 to sealingly prevent flow from channel 15a into channel 9. The piston 150 has a shoulder 158 which is urged against a shoulder 159 of the channel 9 to prevent the crushing of O-ring 161 on the shoulder 165.

To insure that the piston 150 is sealingly mounted in the channel 9, an O-ring 161 is disposed on a shoulder 162 on the piston 150 and an O-ring 163 is disposed in a recess 164. The shoulder 162 and O-ring 161 are disposed so that upon upward movement of the piston, a shoulder 165 of the channel 9 is sealingly abutted by the O-ring 161 and further movement of the piston 150 is prohibited. Upon movement of the piston 150 upwardly and its contact of and subsequent movement of the valve member 154 out of sealing contact with the shoulder 157, air is permitted to flow from channel 15a, from the valve 4 out of port 4b to lines 104-107 (not shown in FIG. 19), and then to the brake diaphragm chambers to effect application of the brakes. In the brake releasing mode, air flowing in through channel 13, port 4C, and through hole 166 to push against the O-ring 161 and the piston, causing the piston to move downwardly and thereby letting air flow from lines 104-107 to the exhaust port 49 thereby releasing the brakes. Valve member 154 seals on both face 157 and stinger 153 to stop air flow from 15a thereby preventing further air flow to lines 104-107. When the brakes are applied, the piston 150 moves up, urged by spring 151 and the exhausting of control air through the hole 166. Piston 150 removes valve member 154 from the sealing face 157 and seals the stinger 153 on the valve member 154 so that air can flow from the channel 15a to channel 9 and then to the brakes.

Valve member 154 sealingly contacts the shoulder 157 and then exhausting air from lines 104-107 flows through a bore 155 in the piston 150 when it moves downwardly and thence to the exhaust port 49. Thus making the area that air acting through hole 166 pushing down on the piston 150 and spring 151 larger than the area provided before the piston 150 moves down to an inside diameter 167.

The valve 4 has built in hysteresis because of the design of the bore of the channel 9 and the piston 150. An inside diameter 167 of the channel 9 is greater than an inside diameter 168 of the channel 9. Therefore more air pressure is required to open the valve and exhaust air off the brake diaphragms than is needed to re-seat the valve and apply the brakes. Since the diameter 168 is less than the diameter 167, it takes more pressure to move the piston 150 downwardly than to move it upwardly to re-seat it. Once the piston starts to move down it reaches the area of larger diameter, and thereby the force on the piston 150 is increased (force=pressure×area) at which point the piston begins to move faster. Upon upward movement of the piston there is a concomitant decrease in force and at that point the piston begins to move more slowly.

This built-in hysteresis is advantageous because it insures that there is adequate air pressure applied against the brake diaphragms to insure that the locking pistons are released upon air-up of the system from zero air pressure and it insures that reservoir 27 is adequately filled to re-apply the brakes. Also this hysteresis allows the brakes to release more quickly and at a pressure higher than that at which they were applied. This hysteresis provides a margin of safety if some air leaks from the reservoirs by applying the service brakes. Such leaking air will not cause an unwanted oscillating application and release of the brakes which would occur if air pressure on O-ring 161 allowed the stinger 153 to unseat and re-seat the valve member 154. This would cause the brakes to apply and release.

Figure 21:
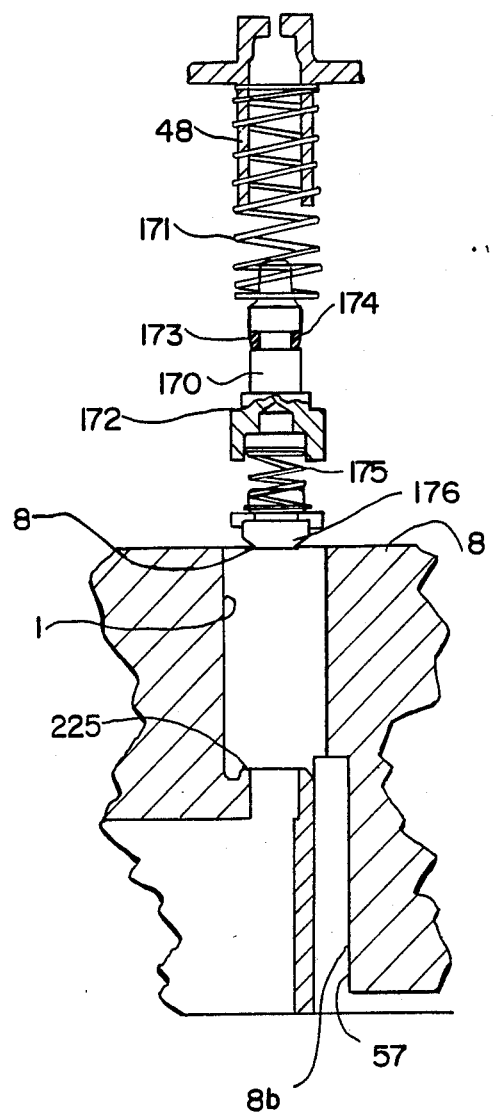
FIG. 21 is a side cross-sectional view of a pressure protection valve according to this invention.

As shown in FIG. 21 the pressure protection valve 8 has a pressure protection valve piston 170 movably mounted in the channel 1 which communicates with the channel 57. The piston 170 moves partially within the valve sleeve 48. A spring 171 encircles the valve sleeve 48 projecting from the bottom of top plate 29 and urges the piston 170 downwardly by pushing against a shoulder 172 on the piston 170. An O-ring 173 is disposed in a recess 174 on the piston 170 to provide a seal to raise the piston once a valve member 176 allows air to flow from port 8a to port 8b to the primary reservoir 28 (not shown in FIG. 21). The pressure protection valve insures that the emergency reservoir 27 is filled first since the spring 175 urges the valve member 176 against the seat 225 until a desired pressure is reached.

Figure 20:
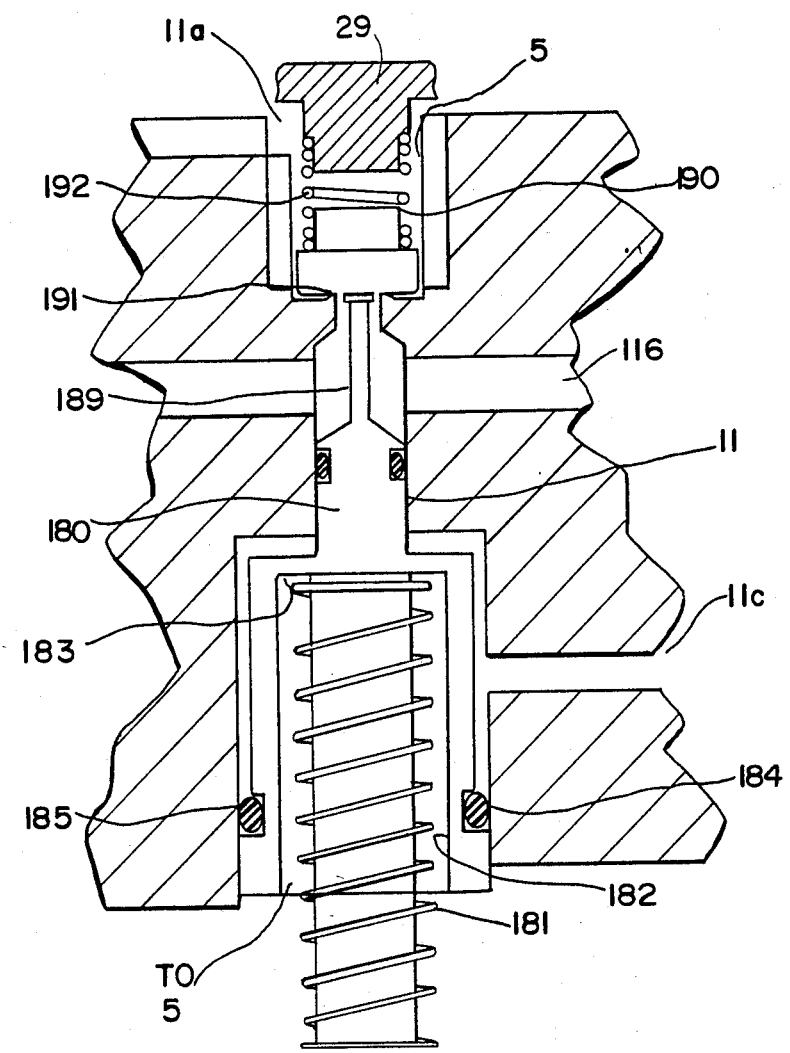
FIG. 20 is a side cross-sectional view of a pressure reducing valve according to this invention.

As shown in FIG. 20 the pressure reducing valve 11 in the channel 5 has a pressure reducing piston 180 movably disposed in the channel 5 with a spring 181 disposed in a hollow recess 182 in the piston 180. The spring 181, which urges the piston 180 upwardly, can bias against an inside face 183 of the recess 182 and against the bottom plate 30 (not shown in FIG. 20) of the MF valve 10 (FIG. 1). An O-ring 184 is disposed in a recess 185 on the piston 180 to insure that the piston 180 is sealingly mounted in the channel 5. A stinger 189 on the piston 180 can move to contact and unseat a valve 190 which is also movably disposed in the channel 5 and which is movable to sealingly abut a shoulder 191 of the channel 5. A spring 192 urges the valve 190 downwardly and is biased against the top plate 29 (not shown in FIG. 20) of the MF valve 10.

Supply air (unreduced in pressure) from both reservoirs 27, 28 (in FIG. 10) enters the pressure reducing valve through port 11a and goes out of port 11b to the brakes (through valve 37 and the emergency control valve). When pressure in the lines 104–107 reaches a desired level, this air under pressure moves the pressure reducing piston 180 downwardly and shuts off flow into port 11a. Since this air has gone into a larger volume (in the brake diaphragm chambers) it is reduced in pressure. The pressure of this air is sensed through the port 11c which is in fluid communication with the lines 104–107 via a line 6 (in FIG. 10). This produces a relatively fast shut off of air to the brakes as compared to other valves which do not use another line (such as 11c) to sense air pressure.

The pressure reducing valve is set at a pre-set desired pressure by adjusting, selecting or designing the spring 181 so that a desired pressure is delivered to the brakes to apply them. Air from either reservoir can flow to the pressure reducing valve to apply the brakes.

In systems according to this invention even if one of the supply lines from a reservoir is broken or one of the reservoirs is ruptured or leaking the pressure protection valve 8 and one-way check valve 42 act as protection means to isolate the multifunction valve from the broken line or ruptured or leaking reservoir so that brakes can still be applied with air from the intact reservoir or through the intact flow line.

Figure 16:
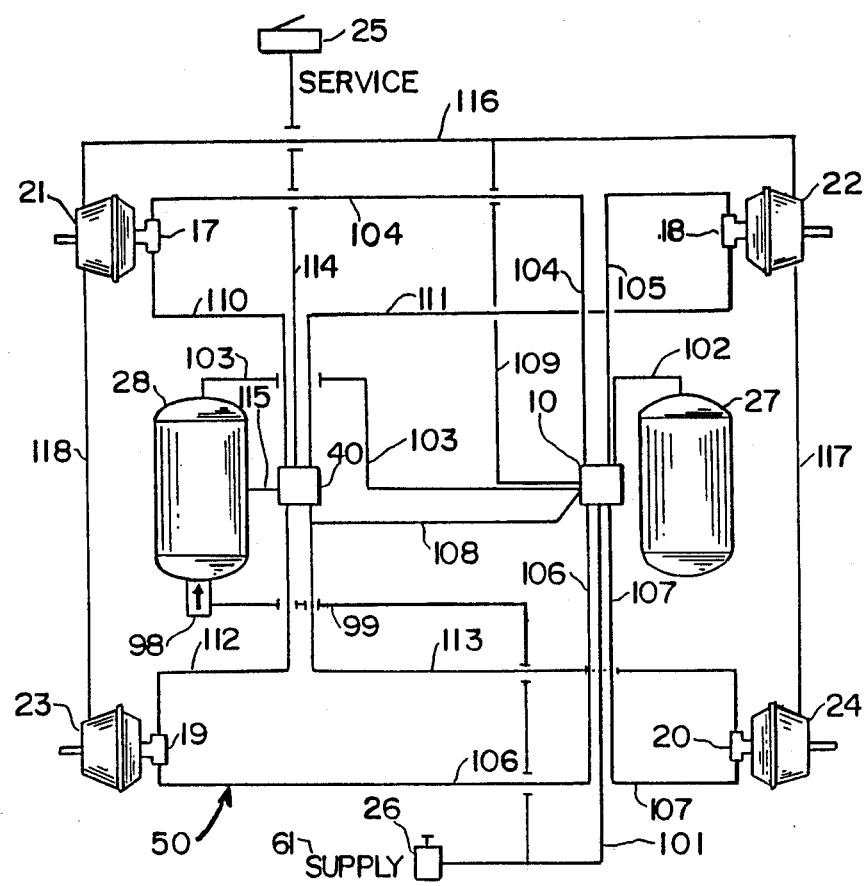
FIG. 16 is a schematic view of a system according to the present invention in which a trailer cannot be moved without full pressure in both reservoirs.
Figure 17:
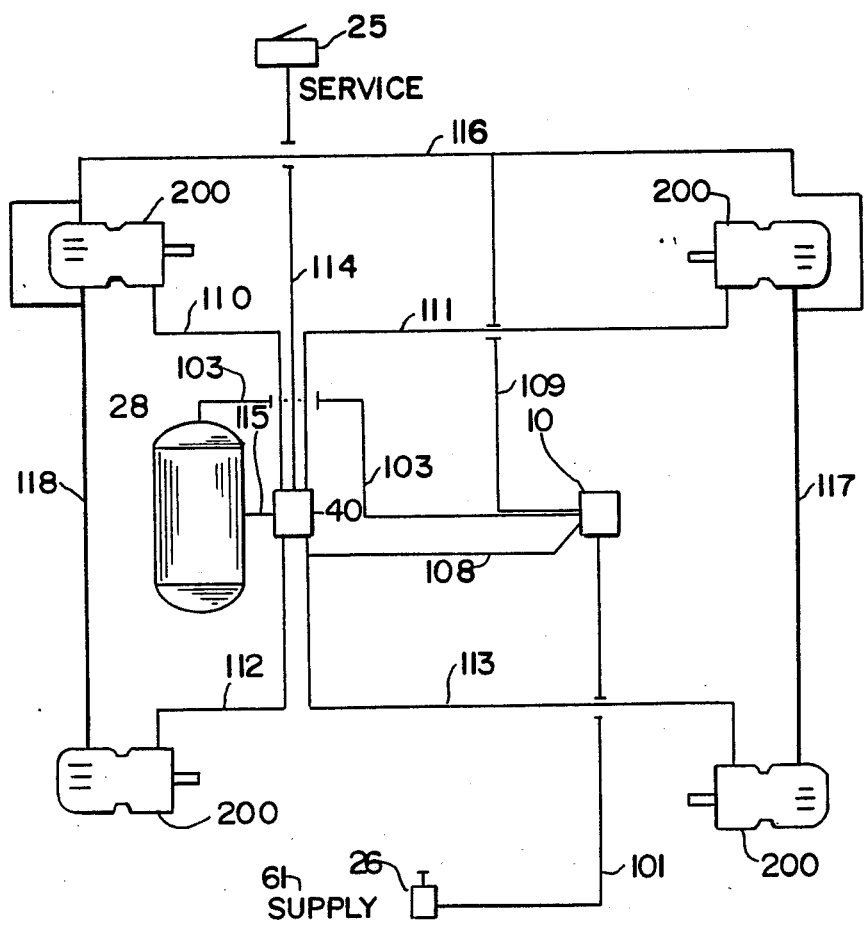
FIG. 17 is a schematic view of a system according to the present invention adapted for use with coiled spring brakes.

FIG. 16 presents a schematic view of a system according to the present invention in which a separate flow line 99 serves to transmit air under pressure to the primary reservoir 28. A one-way check valve 98 prevents back flow from the reservoir 28 into the flow line 99. But for these differences, the apparatus of the system of FIG. 16 is like that of FIG. 11. In this system both reservoirs 27, 28 can be filled simultaneously so that the vehicle cannot be moved without full reservoir pressure in both reservoirs. FIG. 17 presents a schematic view of another system according to the present invention in which a plurality of brakes 200 are employed which are conventional spring brakes with a coil spring and service diaphragm rather than brakes such as the brakes 21–24 of FIG. 16. The multifunction valve 10 serves to provide air to the brakes 200 to release the brakes. In this system there is no need for an emergency reservoir 27 (unless a two tank system is needed in which case a second reservoir would be in fluid communication with reservoir 28).

In conclusion, therefore, it is seen that the present invention and the embodiments disclosed herein are well adapted to carry out the objectives and obtain the ends set forth at the outset as well as others inherent therein. It is intended that the appended claims be understood as referring to all equivalent elements of the recited elements and all equivalent combinations of the recited combinations which accomplish substantially the same results in substantially the same manner.

What is claimed is:

1. An air brake system for a vehicle comprising
a plurality of air-actuated brakes connected to axles of the vehicle,
a first reservoir for holding air under pressure to be supplied to actuate the air-actuated brakes,
a second reservoir for holding air under pressure to be supplied to actuate the air-actuated brakes,
a multifunction valve in fluid communication via flow lines with the air-actuated brakes, the first reservoir, and the second reservoir, the multifunction valve having a single unitary housing and including within the single unitary housing
pressure protection valve means which permit flow from an air supply of air under pressure to the first reservoir while preventing such flow to the second reservoir, pressure reduction valve means for reducing the pressure of the air from the air supply before it flows to the air-actuated brakes, emergency control valve means for delivering air at a desired pressure to the brakes when air from the air supply ceases to flow, the desired pressure being less than the pressure of the air as supplied by the air supply, and syncro valve means for delaying actuation of the air-activated brakes until air at a desired air pressure flows to the syncro valve means.

2. The air brake system of claim 1 wherein both the first reservoir and the second reservoir are supplied with air that flows to the multifunction valve in a single flow line from the air supply.

3. The air brake system of claim 1 wherein air under pressure is supplied to the air-actuated brakes in flow lines from either the first reservoir or the second reservoir.

4. The air brake system of claim 1 wherein the syncro valve means includes bypass valve means permitting air under pressure to flow from the syncro valve means if it malfunctions to permit locking of the air-actuated brakes.

5. The air brake system of claim 1 wherein the emergency control valve means has peak pressure means for delivering air momentarily at a peak pressure to the air-actuated brakes to release them from a locked configuration.

6. The air brake system of claim 1 including also check valve means preventing air under pressure from flowing from the reservoirs to the air supply.

7. The air brake system of claim 6 including also protector valve means for preventing flow to or from a ruptured or leaking first or second reservoir so that said ruptured or leaking reservoir is isolated from the multifunction valve.

8. The air brake system of claim 1 wherein the first reservoir is an emergency reservoir and including also release means to release the air-actuated brakes after they have been actuated by air from the emergency reservoir and sensing means for preventing actuation of the release means unless there is air under pressure in the emergency reservoir.

9. The air brake system of claim 1 wherein the air actuated brakes are of the single-diaphragm type.

10. The air brake system of claim 1 wherein the air actuated brakes are of the dual-diaphragm type.

11. The air brake system of claim 1 wherein the air actuated brakes are of the locking-piston type.

12. The air brake system of claim 1 wherein the vehicle is a trailer.

13. The air brake system of claim 1 wherein the vehicle is a tractor-trailer combination.

14. The air brake system of claim 1 wherein the vehicle is a bus.

15. The air brake system of claim 1 wherein the vehicle is a truck.

16. An air brake system for a vehicle comprising
a plurality of air-actuated brakes connected to axles of the vehicle,
a first reservoir for holding air under pressure to be supplied to actuate the air-actuated brakes,
a second reservoir for holding air under pressure to be supplied to actuate the air-actuated brakes,
a multifunction valve in fluid communication via flow lines with the air-actuated brakes, the first reservoir, and the second reservoir, the multifunction valve having a single unitary housing and including within the single unitary housing pressure protection valve means which permit flow from an air supply of air under pressure to the first reservoir while preventing such flow to the second reservoir, pressure reduction valve means for reducing the pressure of the air from the air supply before it flows to the air-actuated brakes, emergency control valve means for delivering air at a desired pressure to the brakes when air from the air supply ceases to flow, the desired pressure being less than the pressure of the air as supplied by the air supply, and syncro valve means for delaying actuation of the air-activated brakes until air at a desired air pressure flows to the syncro valve means.

protector valve means for preventing flow to or from a ruptured or leaking first or second reservoir so that said ruptured or leaking reservoir is isolated from the multifunction valve.

17. An air brake system for a vehicle comprising
a plurality of air-actuated brakes connected to axles of the vehicle,
a first reservoir for holding air under pressure to be supplied to actuate the air-actuated brakes,
a second reservoir for holding air under pressure to be supplied to actuate the air-actuated brakes,
a multifunction valve in fluid communication via flow lines with the air-actuated brakes, the first reservoir, and the second reservoir, the multifunction valve having a single unitary housing and including within the single unitary housing pressure protection valve means which permit flow from an air supply of air under pressure to the first reservoir while preventing such flow to the second reservoir, pressure reduction valve means for reducing the pressure of the air from the air supply before it flows to the air-actuated brakes, emergency control valve means for delivering air at a desired pressure to the brakes when air from the air supply ceases to flow, the desired pressure being less than the pressure of the air as supplied by the air supply, the emergency control valve means having peak pressure means for delivering air momentarily at a peak pressure to the air-actuated brakes to release them from a locked configuration, syncro valve means for delaying actuation of the air-activated brakes until air at a desired air pressure flows to the syncro valve means, the syncro valve means includes bypass valve means permitting air under pressure to flow from the syncro valve means if it malfunctions to permit locking of the air-actuated brakes, and the first reservoir and the second reservoir are supplied with air that flows to the multifunction valve in a single flow line from the air supply, protector valve means for preventing flow to or from a ruptured or leaking first or second reservoir so that said ruptured or leaking reservoir is isolated from the multifunction valve.

18. A vehicle air brake system connectable to a source of supply pressure air and to a source of service pressure air, the air brake system comprising a primary pressure reservoir having a delivery valve connection for delivery of air at the pressure of air in the primary reservoir with an application of service pressure air to the delivery valve, a secondary pressure reservoir, a multifunction valve connected to said secondary pressure reservoir having an input connection for charging said primary and secondary reservoir from the source supply pressure air and an output connection delivering air at a pressure equal to the pressure of air in said secondary reservoir, a plurality of vehicle air brake assemblies, each operating a respective brake actuator rod, each of said brake assemblies including a pressure housing with a first opening on one side thereof through which said actuator rod axially operates in a braking direction and a return direction opposite thereto, a diaphragm positioned for actuating said actuator rod in the braking direction, said pressure housing having a second opening on the side of said diaphragm opposite from said actuator rod for receiving pressure for actuating said diaphragm, and a two-way, open-center shuttle valve connected to said second opening having a first input port on one side of its center for receiving air under pressure from said primary reservoir via said delivery valve and a second input port on the other side of its center for receiving air under pressure from said secondary reservoir via said output connection of said multifunction valve for providing actuating pressure against said diaphragm, an imbalance of primary and secondary air pressure closing said two-way valve input port to the low pressure one of said imbalanced primary and secondary pressures while maintaining pressure from the high pressure of one of said imbalanced primary and secondary pressures.

19. A vehicle air brake system in accordance with claim 18, wherein each of said brake assemblies includes a mechanical latching means for securing said actuator rod in place when an applied pressure drops below a predetermined level.

20. A vehicle air brake system in accordance with claim 18, wherein said source of service pressure air controls only the primary reservoir's air supply to the brake diaphragm, and said source of pressure supply air controls both the primary and emergency reservoirs air supply to the brake diaphragm.

21. A vehicle air brake system in accordance with claim 18, wherein said shuttle valve is operable to close off the port from the emergency reservoir allowing full flow from the primary reservoir during a service operation, and is operable to balance the air flow from both the primary and emergency reservoirs by being positioned in the middle of the valve if both flows are equal and closing the input port to the low pressure side of an inbalance exists between the primary and emergency reservoirs during emergency operation.

22. A multifunction valve for use with a vehicle air brake system, the air brake system including air supply means, a plurality of air-actuated brakes connected to axles of the vehicle, a first emergency reservoir for holding air under pressure to be supplied to actuate the air-brakes in an emergency mode, a second service reservoir for holding air under pressure to be supplied to actuate the air-brakes in a normal service mode, the multifunction valve in fluid communication via interconnecting flow lines with the air-actuated brakes, the first emergency reservoir, and the second service reservoir, the multifunction valve comprising a single unitary housing, pressure protection valve means within the unitary housing which permit flow from an air supply of air under pressure to the first reservoir while preventing such flow to the second reservoir, pressure reduction valve means within the unitary housing for reducing the pressure of the air from the air supply before it flows to the air-actuated brakes, emergency control valve means within the unitary housing for delivering air at a desired pressure to the brakes when air from the air supply ceases to flow, a pressure less than the pressure of the air as supplied by the air supply syncro valve means within the unitary housing for delaying actuation of the air-activated brakes until air at a desired air pressure flows to the syncro valve means.

23. The multifunction valve of claim 22 wherein both the first reservoir and the second reservoir are supplied with air that flows to the multifunction valve in a single flow line from the air supply.

24. The multifunction valve of claim 22 wherein air under pressure is supplied to the air-actuated brakes in flow lines from either the first reservoir or the second reservoir.

25. The multifunction valve of claim 22 wherein the syncro valve means includes bypass valve means permitting air under pressure to flow from the syncro valve means if it malfunctions to permit locking of the air-actuated brakes.

26. The multifunction valve of claim 22 wherein the emergency control valve means has peak pressure means for delivering air momentarily at a peak pressure to the air-actuated brakes to release them from a locked configuration.

27. The multifunction valve of claim 22 including also check valve means within the unitary housing to prevent air under pressure from flowing from the reservoirs to the air supply.

28. The multifunction valve of claim 27 including also protector valve means for preventing flow to or from a ruptured or leaking first or second reservoir or broken flow line so that said ruptured or leaking reservoir or broken flow line is isolated from the multifunction valve.

29. The multifunction valve of claim 23 wherein the first reservoir is an emergency reservoir and including also release means to release the air-actuated brakes after they have been actuated by air from the emergency reservoir and sensing means for preventing actuation of the release means unless there is air under pressure in the emergency reservoir.

30. A multifunction valve for use with a vehicle air brake system, the air brake system including air supply means, a plurality of air-actuated brakes connected to axles of the vehicle, a first emergency reservoir for holding air under pressure to be supplied to actuate the air-brakes in an emergency mode, a second service reservoir for holding air under pressure to be supplied to actuate the air-brakes in a normal service mode, the multifunction valve in fluid communication via interconnecting flow lines with the air-actuated brakes, the first emergency reservoir, and the second service reservoir, the multifunction valve comprising a single unitary housing,
  pressure protection valve means within the unitary housing which permit flow from an air supply of air under pressure to the first reservoir while preventing such flow to the second reservoir,
  pressure reduction valve means within the unitary housing for reducing the pressure of the air from the air supply before it flows to the air-actuated brakes,
  emergency control valve means within the unitary housing for delivering air at a desired pressure to the brakes when air from the air supply ceases to flow, a pressure less than the pressure of the air as supplied by the air supply
  syncro valve means within the unitary housing for delaying actuation of the air-activated brakes until air at a desired air pressure flows to the syncro valve means, and
  protector valve means for preventing flow to or from a ruptured or leaking first or second reservoir or broken flow line so that said ruptured or leaking reservoir or broken flow line is isolated from the multifunction valve.

31. A multifunction valve for use with a vehicle air brake system, the air brake system including air supply means, a plurality of air-actuated brakes connected to axles of the vehicle, a first emergency reservoir for holding air under pressure to be supplied to actuate the air-brakes in an emergency mode, a second service reservoir for holding air under pressure to be supplied to actuate the air-brakes in a normal service mode, the multifunction valve in fluid communication via interconnecting flow lines with the air-actuated brakes, the first emergency reservoir, and the second service reservoir, the multifunction valve comprising a single unitary housing,
  pressure protection valve means within the unitary housing which permit flow from an air supply of air under pressure to the first reservoir while preventing such flow to the second reservoir,
  pressure reduction valve means within the unitary housing for reducing the pressure of the air from the air supply before it flows to the air-actuated brakes,
  emergency control valve means within the unitary housing for delivering air at a desired pressure to the brakes when air from the air supply ceases to flow, a pressure less than the pressure of the air as supplied by the air supply,
  the emergency control valve means having peak pressure means for delivering air momentarily at a peak pressure to the air-actuated brakes to release them from a locked configuration,
  syncro valve means within the unitary housing for delaying actuation of the air-activated brakes until air at a desired air pressure flows to the syncro valve means,
  the syncro valve means including bypass valve means permitting air under pressure to flow from the syncro valve means if it malfunctions to permit locking of the air-actuated brakes, and
  check valve means within the unitary housing to prevent air under pressure from flowing from the reservoirs to the air supply.

32. A vehicle brake assembly for operating a brake actuator rod, said brake assembly including
  a pressure housing with a first opening on one side thereof through which said actuator rod axially operates in a braking direction and a return direction opposite thereto,
  a diaphragm positioned for actuating said actuator rod in the braking direction,
  said pressure housing having a second opening on the side of said diaphragm opposite from said actuator rod for receiving pressure for actuating said diaphragm,
  a two-way, open-center shuttle valve connected to said second opening having a first input port on one side of its center for receiving pressure from a service pressure supply and a second input port on the other side of its center for receiving pressure from an emergency pressure supply, a balance of service and emergency pressures keeping this shuttle of said open-center shuttle valve centered so that the common pressure of said service and emergency pressures provide actuating pressure against said diaphragm, an imbalance of said service and energency pressures closing said two-way valve input port to the low pressure one of said imbalance service and emergency pressures while, maintaining pressure from the high pressure one of said imbalance service and emergency pressures,
  a rack affixed to said actuator rod providing teeth for holding engagement to prevent movement of said actuator rod in the return direction,
  a piston having a piston rod end which enters into holding engagement with said rack means, said piston means further including bias means urging said piston rod into said holding engagement and a ported connection to apply emergency pressure for urging said piston rod out of said holding engagement, said piston rod entering into holding engagement when the applied emergency pressure drops below a predetermined drop out value, and
  a multifunction valve including means for causing delay between actuating said actuator rod in the braking direction and allowing said piston rod to enter into holding engagement during emergency brake application.

33. A vehicle brake assembly for operating a brake actuator rod, said brake assembly including
  a pressure housing with a first opening on one side thereof through which said actuator rod axially operates in a braking direction and a return direction opposite thereto,
  a diaphragm positioned for actuating said actuator rod in the braking direction,
  said pressure housing having a second opening on the side of said diaphragm opposite from said actuator rod for receiving pressure for actuating said diaphragm,
  a two-way, open-center shuttle valve connected to said second opening having a first input port on one side of its center for receiving pressure from a service pressure supply and a second input port on the other side of its center for receiving pressure from an emergency pressure supply, a balance of service and emergency pressures keeping this shuttle of said open-center shuttle valve center so that the common pressure of said service and emergency pressures provide actuating pressure against said diaphragm, an imbalance of said service and emergency pressures closing said two-way valve input port to the low pressure one of said imbalance service and emergency pressures while maintaining pressure from the high pressure one of said imbalance service and emergency pressures, a rack affixed to said actuator rod providing teeth for holding engagement to prevent movement of said actuator rod in the return direction, a piston having a piston rod end which enters into holding engagement with said rack means, said piston means further including bias means urging said piston rod into said holding engagement and a ported connection to apply emergency pressure for urging said piston rod out of said holding engagement, said piston rod entering into holding engagement when the applied emergency pressure drops below a predetermined drop out value, and a multifunction valve that increases the pressure level actuating said actuator rod in the braking direction to overcome friction between said actuator rod and said piston rod during emergency brake release.

34. A vehicle brake assembly for operating a brake actuator rod, said brake assembly including a pressure housing with a first opening on one side thereof through which said actuator rod axially operates in a braking direction and a return direction opposite thereto, a diaphragm positioned for actuating said actuator rod in the braking direction, said pressure housing a second opening on the side of said diaphragm opposite from said actuator rod for receiving pressure for actuating said diaphragm, a two-way, open-center shuttle valve connected to said second opening having a first input port on one side of its center for receiving pressure from a service pressure supply and a second input port on the other side of its center for receiving pressure from an emergency pressure supply, a balance of service and emergency pressures keeping the shuttle of said open-center shuttle valve centered so that the common pressure of said service and emergency pressure provide actuating pressure against said diaphragm, an imbalance of said service and emergency pressures closing said two-way valve input port to the low pressure one of said imbalance service and emergency pressures while maintaining pressure from the high pressure one of said imbalance service and emergency pressures, a rack affixed to said actuator rod providing teeth for holding engagement to prevent movement of said actuator rod in the return direction, a piston having a piston rod end which enters into holding engagement with said rack means, said piston means further including bias means urging said piston rod into said holding engagement and a ported connection to apply emergency pressure for urging said piston rod out of said holding engagement, said piston rod entering into holding engagement when the applied emergency pressure drops below a predetermine drop out valve, and a multifunction valve including means for causing delay between actuating said actuator rod in the braking direction and allowing said piston rod to enter into holding engagement during emergency brake application as well as increases the pressure level actuating said actuator rod in the braking direction to overcome friction between said actuator rod and said piston rod during emergency brake release.

35. A vehicle brake assembly for operating a brake actuator rod, said brake assembly including a pressure housing with a first opening on one side thereof through which said actuator rod axially operates in a braking direction and a return direction opposite thereto, a diaphragm positioned for actuating said actuator rod in the braking direction, said pressure housing having a second opening on the side of said diaphragm opposite from said actuator rod for receiving pressure for actuating said diaphragm, a two-way, open-center shuttle valve connected to said second opening having a first input port on one side of its center for receiving pressure from a service pressure supply and a second input port on the other side of its center for receiving pressure from an emergency pressure supply, a balance of service and emergency pressures keeping the shuttle of said open-center shuttle valve centered so that the common pressure of said service and emergency pressures provide actuating pressure against said diaphragm, an imbalance of said service and emergency pressures closing said two-way valve input port to the low pressure one of said imbalance service and emergency pressures while maintaining pressure from the high pressure one of said imbalance service and emergency pressures, and means to prevent the release of the emergency brake unless the emergency pressure supply sufficient air pressure.

36. A syncro valve comprising a valve body a main flow channel through which air under pressure can flow disposed in and through the valve body, the main flow channel having an inlet end in a mid portion there of, and another end in a bottom portion thereof, a source of supply air under pressure in communication with the inlet end of the main flow channel so that supply air can flow from the source of supply air into the main flow channel, a syncro piston movably disposed in the top portion of the main flow channel, the syncro piston movable to open a bypass valve in the main flow channel after air at a desired pressure is flowing into a top inlet into the top portion of the main flow channel, a syncro spring in contact with the syncro piston and urging it upwardly so that air under pressure flowing into the top inlet end must be of sufficient pressure to overcome the syncro spring's force before the syncro piston will move downwardly, and a syncro piston stinger extending downwardly from the syncro piston within the main flow channel, a bypass valve for opening and closing off the outlet of the main flow channel, the bypass valve having a bypass valve member movably disposed in the outlet end of the main flow channel, the valve member urged upwardly by a bypass spring disposed beneath the valve member and abutting the valve body, the bypass valve member having a bypass orifice therethrough which permits air to flow from the main flow channel to and through the inlet, and the stinger movable with the syncro piston to push the bypass valve member downwardly to open the outlet to permit flow from the outlet to the inlet when there is not air under pressure coming through the inlet.

37. An emergency control valve comprising a valve body a main flow channel through which air under pressure can flow disposed in and through the valve body and having an exhaust port in a first outlet end in a bottom portion thereof and a second outlet end in a top portion thereof, a first flow channel in fluid communication with the outlet end of the main flow channel, a second flow channel in fluid communication with the second outlet end main flow channel, a third flow channel in fluid communication with the main flow channel, an emergency piston movably disposed in the main flow channel, an emergency spring abutting the emergency piston and urging it upwardly so that the force of air flowing to the emergency piston must be of sufficient pressure to overcome the force of the spring before the emergency piston will move downwardly and permit flow out of the exhaust port, a check valve disposed in the first outlet and of the main flow channel for closing off flow from the main flow channel to the first flow channel, the check valve comprising,

- a check valve member movably disposed in the first outlet end of the main flow channel and movable to close off flow from the main flow channel to the first flow channel,
- a check valve spring abutting valve body and the check valve member and urging it downwardly to close off flow from the main flow channel to the first flow channel so that air flow to and against the check valve member must be of sufficient force to overcome the force of the check valve spring before the check valve member will move upwardly permitting flow through the check valve,
- a stinger extending from the emergency piston upwardly and movable to contact and move the check valve member to open the check valve allowing air to flow from the first flow channel to the second flow channel the stinger and the emergency piston each having a control bore therethrough, the bores in fluid communication to permit exhausting of air through the bores, the stinger seatable against the check valve member to prevent flow through the bore of the stinger.

38. An emergency control valve as claimed in claim 37 wherein the emergency piston has a generally cylindrical main body and two different generally circular faces formed thereof, one face being larger in diameter than the other the main flow channel having portions therein corresponding in size to the two different faces so that the emergency piston is sealingly disposed in the main flow channel, the smaller portion of the main flow channel disposed above the larger portion and the face of the emergency piston with a smaller diameter being disposed above the face with a larger diameter so that more pressure is required to move the piston downwardly than to move it upwardly.

39. A pressure reducing valve for reducing the pressure of air supplied to the valve, the valve comprising a valve body a main flow channel through which the air can flow disposed in and through the valve body, the main flow channel having an inlet and an outlet, a first flow channel in fluid communication with the main flow channel, a second flow channel in fluid communication with the main flow channel, a third flow channel in fluid communication with the main flow channel, a reducing piston movably disposed in the main flow channel and movable to open and close off flow of air under pressure from the first flow channel to the second flow channel a reducing spring in contact with the reducing piston and urging it upwardly so that it contacts a reducing check valve disposed in the valve body to unseat the check valve permitting air flow from the first flow channel to the second flow channel, the reducing check valve comprising a reducing check valve member movably disposed in the inlet of the main flow channel and movable to seat against a shoulder in the main flow channel to prevent flow from the inlet to the outlet, the reducing piston having a stinger extending therefrom for contacting the reducing check valve member to seat and unseat it without restricting flow from the inlet to the outlet, the third channel in communication with a source of air under pressure so that when air from said source enters the third channel it moves the reducing piston downwardly effecting seating of the reducing check valve member thereby preventing air flow from the inlet to the outlet.

40. An air brake system for a vehicle comprising a plurality of air-actuated brakes connected to axles of the vehicle, a first reservoir for holding air under pressure to be supplied to actuate the air-actuated brakes, a second reservoir for holding air under pressure to be supplied to actuate the air-actuated brakes, a multifunction valve in fluid communication via flow lines with the air-actuated brakes, the first reservoir, and the second reservoir, the multifunction valve having a single unitary housing and including within the single unitary housing pressure protection valve means which permit flow from an air supply of air under pressure to the first reservoir while preventing such flow to the second reservoir, pressure reduction valve means for reducing the pressure of the air from the air supply before it flows to the air-actuated brakes, emergency control valve means for delivering air at a desired pressure to the brakes when air from the air supply ceases to flow, the desired pressure being less than the pressure of the air as supplied by the air supply, and syncro valve means for delaying actuation of the air-activated brakes until air at a desired air pressure flows to the syncro valve means, the syncro valve means comprising a syncro valve body, a main syncro flow channel through which air under pressure can flow disposed in and through the syncro valve body, the main syncro flow channel having a syncro inlet end in fluid communication with a syncro source of supply air under pressure which provides said air to the brakes in a syncro mid portion thereof, and another end in fluid communication with the brakes in a syncro bottom portion thereof having a syncro outlet therein, the syncro source of supply air under pressure in communication with the syncro inlet end of the main syncro flow channel so that supply air can flow from the syncro source of supply air into the main syncro flow channel, a syncro piston movably disposed in the top portion of the main syncro flow channel, the syncro piston movable to open a syncro bypass valve in the main syncro flow channel after air at a desired pressure is flowing into a top syncro inlet into the top syncro portion of the main syncro flow channel, a syncro spring in contact with the syncro piston and urging it upwardly so that air under pressure flowing into the top inlet end must be of sufficient pressure to overcome the syncro spring's force before the syncro piston will move downwardly, and a syncro piston stinger extending downwardly from the syncro piston within the main syncro flow channel, a syncro bypass valve for opening and closing off the outlet of the main syncro flow channel, the syncro bypass valve having a syncro bypass valve member movably disposed in the outlet end of the main syncro flow channel, the syncro valve member urged upwardly by a syncro bypass spring disposed beneath the syncro valve member and abutting the syncro valve body, the syncro bypass valve member having a syncro bypass orifice therethrough which permits air to flow from the main syncro flow channel to and through the syncro inlet, and the syncro piston stinger movable with the syncro piston to push the syncro bypass valve member downwardly to open the syncro outlet to permit flow from the syncro outlet to the syncro inlet when there is not air under pressure coming through the syncro inlet, the emergency control valve means comprising a control valve body, a main control flow channel through which air under pressure can flow disposed in and through the control valve body and having a control exhaust port vented to atmosphere in a first control outlet end in a bottom control portion thereof, and an inlet in a top control portion thereof in fluid communication with a pressure reducing valve, a first control flow channel in fluid communication with the main control flow channel, the first control flow channel having an inlet in fluid communication with the syncro source of supply air, a second control flow channel in fluid communication with the brakes, disposed in fluid communication with the main control flow channel, an emergency piston movably disposed in the main control flow channel, an emergency spring abutting the emergency piston and urging it upwardly so that the force of air flowing to the emergency piston must be of sufficient pressure to overcome the force of the emergency spring before the emergency piston will move downwardly and permit flow out of the control exhaust port, a control check valve disposed in the first control outlet end of the main control flow channel for closing off flow from the main control flow channel to the first control flow channel and thereby preventing flow to the brakes, the control check valve comprising, a control check valve member movably disposed in the first control outlet end of the main control flow channel and movable to close off flow from the main control flow channel to the first control flow channel, a control check valve spring abutting the control check valve member and urging it downwardly to close off flow from the main control flow channel to the first control flow channel so that air flow to and against the control check valve member must be of sufficient force to overcome the force of the control check valve spring before the control check valve member will move upwardly permitting flow through the control check valve thereby permitting flow to the brakes, a control stinger protruding from the emergency piston, the control stinger extending from the emergency piston upwardly and movable to contact and move the control check valve member to open the control check valve allowing air to flow from the first control flow channel to the second control flow channel thereby permitting flow to the brakes, the control stinger and the emergency piston each having a control bore therethrough, the bores in fluid communication to permit exhausting of air through the control bores, the control stinger seatable against the control check valve member to prevent flow through the control bore of the control stinger, the pressure reducing valve means for reducing the pressure of air supplied to the multifunction valve, the pressure reducing valve means valve comprising a reducing valve body, a reducing main flow channel through which the air from the reservoirs can flow disposed in and through the reducing valve body, the main reducing flow channel having a reducing inlet in fluid communication with the reservoirs and a reducing outlet in fluid communication with the emergency control valve means, a first reducing flow channel in fluid communication with the main reducing flow channel in fluid communication with the reservoirs, a second reducing flow channel in fluid communication with the main reducing flow channel in fluid communication with the emergency control valve means, a third reducing flow channel in fluid communication with the main reducing flow channel and the brakes, a reducing piston movably disposed in the main reducing flow channel and movable to open and close off flow of air under pressure from the first reducing flow channel to the second reducing flow channel preventing flow to the emergency control valve means, a reducing spring in contact with the reducing piston and urging it upwardly so that it contacts a reducing check valve disposed in the reducing valve body to unseat the reducing check valve permitting air flow from the first reducing flow channel to the second reducing flow channel thereby allowing flow to the emergency control valve means, the reducing check valve comprising a reducing check valve member movably disposed in the reducing inlet of the main reducing flow channel and movable to seat against a reducing shoulder in the main reducing flow channel to prevent flow from the reducing inlet to the reducing outlet thereby preventing flow to the emergency control valve means, the reducing piston having a reducing stinger extending therefrom for contacting the reducing check valve member to seat and unseat it without restricting flow from the reducing inlet to the reducing outlet, the third reducing channel in fluid communication with the brakes so that air under pressure flowing to the brakes enters the third reducing channel and moves the reducing piston downwardly effecting seating of the reducing check valve member thereby preventing air flow from the reducing inlet to the reducing outlet.

41. A multifunction valve for use with a vehicle air brake system, the air brake system including air supply means, a plurality of air-actuated brakes connected to axles of the vehicle, a first emergency reservoir for holding air under pressure to be supplied to actuate the air-brakes in an emergency mode, a second service reservoir for holding air under pressure to be supplied to actuate the air-brakes in a normal service mode, the multifunction valve in fluid communication via interconnecting flow lines with the air-actuated brakes, the first emergency reservoir, and the second service reservoir, the multifunction valve comprising a single unitary housing, pressure protection valve means within the unitary housing which permit flow from an air supply of air under pressure to the first reservoir while preventing such flow to the second reservoir, pressure reduction valve means within the unitary housing for reducing the pressure of the air from the air supply before it flows to the air-actuated brakes, emergency control valve means within the unitary housing for delivering air at a desired pressure to the brakes when air from the air supply ceases to flow, a pressure less than the pressure of the air as supplied by the air supply, the syncro valve means within the unitary housing for delaying actuation of the air-activated brakes until air at a desired air pressure flows to the syncro valve means, syncro valve means comprising a syncro valve body, a main syncro flow channel through which air under pressure can flow disposed in and through the syncro valve body, the main syncro flow channel having a syncro inlet end in fluid communication with a syncro source of supply air under pressure which provides said air to the brakes in a syncro mid portion thereof, and another end in fluid communication with the brakes in a syncro bottom portion thereof having a syncro outlet therein, the syncro source of supply air under pressure in communication with the syncro inlet end of the main syncro flow channel so that supply air can flow from the syncro source of supply air into the main syncro flow channel, a syncro piston movably disposed in the top portion of the main syncro flow channel, the syncro piston movable to open a syncro bypass valve in the main syncro flow channel after air at a desired pressure is flowing into a top syncro inlet into the top syncro portion of the main syncro flow channel, a syncro spring in contact with the syncro piston and urging it upwardly so that air under pressure flowing into the top inlet end must be of sufficient pressure to overcome the syncro spring's force before the syncro piston will move downwardly, and a syncro piston stinger extending downwardly from the syncro piston within the main syncro flow channel, a syncro bypass valve for opening and closing off the outlet of the main syncro flow channel, the syncro bypass valve having a syncro bypass valve member movably disposed in the outlet end of the main syncro flow channel, the syncro valve member urged upwardly by a syncro bypass spring disposed beneath the syncro valve member and abutting the syncro valve body, the syncro bypass valve member having a syncro bypass orifice therethrough which permits air to flow from the main syncro flow channel to and through the syncro inlet, and the syncro piston stinger movable with the syncro piston to push the syncro bypass valve member downwardly to open the syncro outlet to permit flow from the syncro outlet to the syncro inlet when there is not air under pressure coming through the syncro inlet, the emergency control valve means comprising a control valve body, a main control flow channel through which air under pressure can flow disposed in and through the control valve body and having a control exhaust port vented to atmosphere in a first control outlet end in a bottom control portion thereof, and an inlet in a top control portion thereof in fluid communication with a pressure reducing valve, a first control flow channel in fluid communication with the main control flow channel, the first control flow channel having an inlet in fluid communication with the syncro source of supply air, a second control flow channel in fluid communication with the brakes, disposed in fluid communication with the main control flow channel, an emergency piston movably disposed in the main control flow channel, an emergency spring abutting the emergency piston and urging it upwardly so that the force of air flowing to the emergency piston must be of sufficient pressure to overcome the force of the emergency spring before the emergency piston will move downwardly and permit flow out of the control exhaust port, a control check valve disposed in the first control outlet end of the main control flow channel for closing off flow from the main control flow channel to the first control flow channel and thereby preventing flow to the brakes, the control check valve comprising, a control check valve member movably disposed in the first control outlet end of the main control flow channel and movable to close off flow from the main control flow channel to the first control flow channel, a control check valve spring abutting the control check valve member and urging it downwardly to close off flow from the main control flow channel to the first control flow channel so that air flow to and against the control check valve member must be of sufficient force to overcome the force of the control check valve spring before the control check valve member will move upwardly permitting flow through the control check valve thereby permitting flow to the brakes, a control stinger protruding from the emergency piston, the control stinger extending from the emergency piston upwardly and movable to contact and move the control check valve member to open the control check valve allowing air to flow from the first control flow channel to the second control flow channel thereby permitting flow to the brakes, the control stinger and the emergency piston each having a control bore therethrough, the bores in fluid communication to permit exhausting of air through the control bores, the control stinger seatable against the control check valve member to prevent flow through the control bore of the control stinger, the pressure reducing valve means for reducing the pressure of air supplied to the multifunction valve, the pressure reducing valve means valve comprising a reducing valve body, a reducing main flow channel through which the air from the reservoirs can flow disposed in and through the reducing valve body, the main reducing flow channel having a reducing inlet in fluid communication with the reservoirs and a reducing outlet in fluid communication with the emergency control valve means, a first reducing flow channel in fluid communication with the main reducing flow channel in fluid communication with the reservoirs, a second reducing flow channel in fluid communication with the main reducing flow channel in fluid communication with the emergency control valve means, a third reducing flow channel in fluid communication with the main reducing flow channel and the brakes, a reducing piston movably disposed in the main reducing flow channel and movable to open and close off flow of air under pressure from the first reducing flow channel to the second reducing flow channel preventing flow to the emergency control valve means, a reducing spring in contact with the reducing piston and urging it upwardly so that it contacts a reducing check valve disposed in the reducing valve body to unseat the reducing check valve permitting air flow from the first reducing flow channel to the second reducing flow channel thereby allowing flow to the emergency control valve means, the reducing check valve comprising a reducing check valve member movably disposed in the reducing inlet of the main reducing flow channel and movable to seat against a reducing shoulder in the main reducing flow channel to prevent flow from the reducing inlet to the reducing outlet thereby preventing flow to the emergency control valve means, the reducing piston having a reducing stinger extending therefrom for contacting the reducing check valve member to seat and unseat it without restricting flow from the reducing inlet to the reducing outlet, the third reducing channel in fluid communication with the brakes so that air under pressure flowing to the brakes enters the third reducing channel and moves the reducing piston downwardly effecting seating of the reducing check valve member thereby preventing air flow from the reducing inlet to the reducing outlet.

42. A multifunction valve for use with a vehicle air brake system, the air brake system including air supply means, a plurality of air-actuated brakes connected to axles of the vehicle, a reservoir for holding air under pressure to be supplied to actuate the air-brakes in an emergency mode and in a service mode, the multifunction valve in fluid communication via interconnecting flow lines with the air-actuated brakes, the reservoir, the multifunction valve comprising a single unitary housing, pressure reduction valve means within the unitary housing for reducing the pressure of the air from the air supply before it flows to the air-actuated brakes, emergency control valve means within the unitary housing for delivering air at a desired pressure to the brakes when air from the air supply ceases to flow, a pressure less than the pressure of the air as supplied by the air supply, and syncro valve means within the unitary housing for delaying actuation of the air-activated brakes until air at a desired air pressure flows to the syncro valve means.

43. An air brake system for a vehicle comprising a plurality of air-actuated brakes connected to axles of the vehicle, a first reservoir for holding air under pressure to be supplied to actuate the air-actuated brakes, a second reservoir for holding air under pressure to be supplied to actuate the air-actuated brakes, a multifunction valve in fluid communication via flow lines with the air-actuated brakes, the first reservoir, and the second reservoir, the multifunction valve having a single unitary housing and including within the single unitary housing pressure protection valve means which permit flow from an air supply of air under pressure to the first reservoir while preventing such flow to the second reservoir, pressure reduction valve means for reducing the pressure of the air from the air supply before it flows to the air-actuated actuated brakes, emergency control valve means for delivering air at a desired pressure to the brakes when air from the air supply ceases to flow, the desired pressure being less than the pressure of the air as supplied by the air supply, and syncro valve means for delaying actuation of the air-activated brakes until air at a desired air pressure flows to the syncro valve means, and two-way check valve means with a balance port, the two-way check valve means in fluid communication with an inlet to the multifunction valve, the two-way check valve means for maintaining air on the inlet until the balance port and a supply port on the multifunction valve have no air going to them so that one or more of the air-actuated brakes of the vehicle are automatically re-applied at a desired pressure and so that the air-actuated brakes are not applied until air on the balance port is diminished.

* * * * *